(12) United States Patent
Obata

(10) Patent No.: US 10,240,990 B2
(45) Date of Patent: Mar. 26, 2019

(54) POSITION INDICATOR OF ELECTROMAGNETIC INDUCTION SYSTEM AND ELECTRONIC INK CARTRIDGE

(71) Applicant: Wacom Co., Ltd., Saitama (JP)

(72) Inventor: Masayuki Obata, Tokyo (JP)

(73) Assignee: Wacom Co., Ltd., Saitama (JP)

( * ) Notice: Subject to any disclaimer, the term of this patent is extended or adjusted under 35 U.S.C. 154(b) by 289 days.

(21) Appl. No.: 15/083,131

(22) Filed: Mar. 28, 2016

(65) Prior Publication Data

US 2016/0209279 A1    Jul. 21, 2016

Related U.S. Application Data

(63) Continuation of application No. 13/924,381, filed on Jun. 21, 2013, now Pat. No. 9,297,633.

(30) Foreign Application Priority Data

Sep. 13, 2012 (JP) ................. 2012-202085

(51) Int. Cl.
*G06F 3/046* (2006.01)
*G01L 1/14* (2006.01)
(Continued)

(52) U.S. Cl.
CPC .......... *G01L 1/144* (2013.01); *B41J 2/17546* (2013.01); *G01B 7/003* (2013.01); *G01B 7/14* (2013.01);
(Continued)

(58) Field of Classification Search
CPC .......... G01L 1/144; G01L 1/148; G01B 7/14; G01B 7/003; B41J 2/17546; G06F 3/03545; G06F 3/046; Y10T 137/8242
See application file for complete search history.

(56) References Cited

U.S. PATENT DOCUMENTS 4,878,553 A    11/1989 Yamanami et al.
5,206,785 A    4/1993 Hukashima
(Continued)

FOREIGN PATENT DOCUMENTS

CN    1617088 A    5/2005
CN    1744020 A    3/2006
(Continued)

OTHER PUBLICATIONS

Chinese Office Action, dated May 4, 2017, for Chinese Application No. 201310319460.6, 7 pages.
(Continued)

*Primary Examiner* — Xin Y Zhong
(74) *Attorney, Agent, or Firm* — Seed IP Law Group LLP

(57) ABSTRACT

An electronic ink cartridge includes, in a direction of a central axis within a cylindrical body, a core body extended out from a distal end of the cylindrical body, a coupling member disposed on a side of a proximal end of the cylindrical body, a coil housed between the core body and the coupling member and having a predetermined inductance, and a pressure sensitive element whose capacitance changes according to pressure applied to the core body. Two terminals of the coil are electrically connected respectively to two terminals of the pressure sensitive element to thereby form two terminals of a resonance circuit formed by the coil and the pressure sensitive element. A connecting terminal electrically connected to at least one of the two terminals of the resonance circuit is disposed on a proximal end surface side of the coupling member to be accessible thereon from outside.

13 Claims, 13 Drawing Sheets

(51) Int. Cl.
   *G06F 3/0354* (2013.01)
   *G01B 7/00* (2006.01)
   *B41J 2/175* (2006.01)
   *G01B 7/14* (2006.01)

(52) U.S. Cl.
   CPC .......... *G01L 1/148* (2013.01); *G06F 3/03545* (2013.01); *G06F 3/046* (2013.01); *Y10T 137/8242* (2015.04)

(56) References Cited

U.S. PATENT DOCUMENTS

| | | | |
|---|---|---|---|
| 5,517,124 | A | 5/1996 | Rhoades et al. |
| 5,565,632 | A | 10/1996 | Ogawa |
| 5,576,502 | A | 11/1996 | Fukushima et al. |
| 5,600,105 | A | 2/1997 | Fukuzaki et al. |
| 5,633,471 | A | 5/1997 | Fukushima |
| 6,064,374 | A | 5/2000 | Fukuzaki |
| 6,278,440 | B1 | 8/2001 | Katsurahira et al. |
| 6,724,371 | B1 | 4/2004 | Shenholtz et al. |
| 6,801,192 | B2 | 10/2004 | Fujitsuka et al. |
| 7,926,154 | B2 | 4/2011 | Hong et al. |
| 8,648,839 | B2 | 2/2014 | Liaw et al. |
| 9,269,488 | B2 | 2/2016 | Obata |
| 9,529,458 | B2 | 12/2016 | Obata |
| 2001/0038384 | A1 | 11/2001 | Fukushima et al. |
| 2005/0076719 | A1 | 4/2005 | Jakobsen et al. |
| 2005/0162411 | A1 | 7/2005 | Berkel van |
| 2008/0049376 | A1 | 2/2008 | Stevenson et al. |
| 2008/0061799 | A1 | 3/2008 | Kim et al. |
| 2008/0149401 | A1 | 6/2008 | Hagen et al. |
| 2008/0257613 | A1 | 10/2008 | Katsurahira |
| 2009/0076770 | A1 | 3/2009 | Fukushima et al. |
| 2009/0084614 | A1 | 4/2009 | Fukushima et al. |
| 2009/0114459 | A1* | 5/2009 | Fukushima ......... G06F 3/03545 178/19.03 |
| 2009/0126174 | A1 | 5/2009 | Hong et al. |
| 2010/0051356 | A1 | 3/2010 | Stern et al. |
| 2011/0090146 | A1 | 4/2011 | Katsurahira |
| 2011/0192658 | A1 | 8/2011 | Fukushima et al. |
| 2011/0219892 | A1 | 9/2011 | Fukushima et al. |
| 2011/0291999 | A1 | 12/2011 | Liang et al. |
| 2012/0068975 | A1 | 3/2012 | Wei et al. |
| 2013/0193532 | A1 | 8/2013 | Horie et al. |
| 2013/0329335 | A1 | 12/2013 | Obata |
| 2014/0009863 | A1 | 1/2014 | Obata |
| 2016/0162053 | A1 | 6/2016 | Obata |

FOREIGN PATENT DOCUMENTS

| | | |
|---|---|---|
| CN | 101290549 A | 10/2008 |
| CN | 101539816 A | 9/2009 |
| EP | 0 254 297 A2 | 1/1988 |
| EP | 1 643 351 A2 | 4/2006 |
| EP | 2 187 289 A1 | 5/2010 |
| JP | 04096212 A | 3/1992 |
| JP | 06-33226 U | 4/1994 |
| JP | 08-227336 A | 9/1996 |
| JP | 08-335132 A | 12/1996 |
| JP | 10-214148 A | 8/1998 |
| JP | 2002-108552 A | 4/2002 |
| JP | 2002244806 A | 8/2002 |
| JP | 2003-196014 A | 7/2003 |
| JP | 2006-163652 A | 6/2006 |
| JP | 2009124155 A | 6/2009 |
| JP | 2012-156923 A | 8/2012 |
| JP | 2013156066 A | 8/2013 |
| JP | 2013254816 A | 12/2013 |
| JP | 2014013862 A | 1/2014 |
| TW | 200919266 A | 5/2009 |

OTHER PUBLICATIONS

Extended European Search Report, dated May 27, 2016, for European Application No. 13178152.8-1959, 12 pages.
Japanese Office Action, dated Apr. 13, 2016, for Japanese Application No. 2012-167827, 4 pages.
Taiwanese Office Action, dated May 9, 2017, for Taiwanese Application No. 102125565, 8 pages.
Japanese Office Action dated Jun. 22, 2016, for corresponding JP Application No. 2012-202085, 4 pages.
Advisory Action dated Aug. 19, 2015, for corresponding U.S. Appl. No. 13/913,042, 6 pages.
Taiwanese Office Action, dated Aug. 4, 2017, for Taiwanese Application No. 102123464, 13 pages.
Extended European Search Report, dated Nov. 15, 2016, for corresponding EP Application No. 13182769.3-1872 / 2708993, 13 pages.
Indian Office Action, dated Dec. 13, 2018, for Indian Application No. 2013/DEL/2013, 5 pages.

* cited by examiner

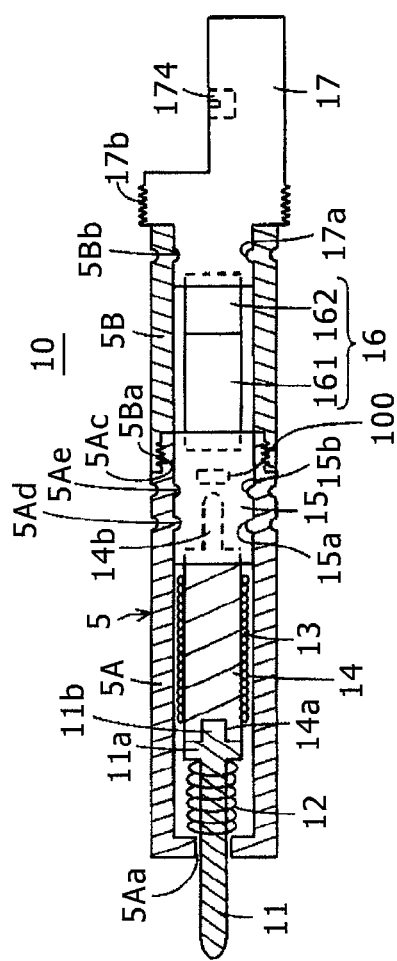
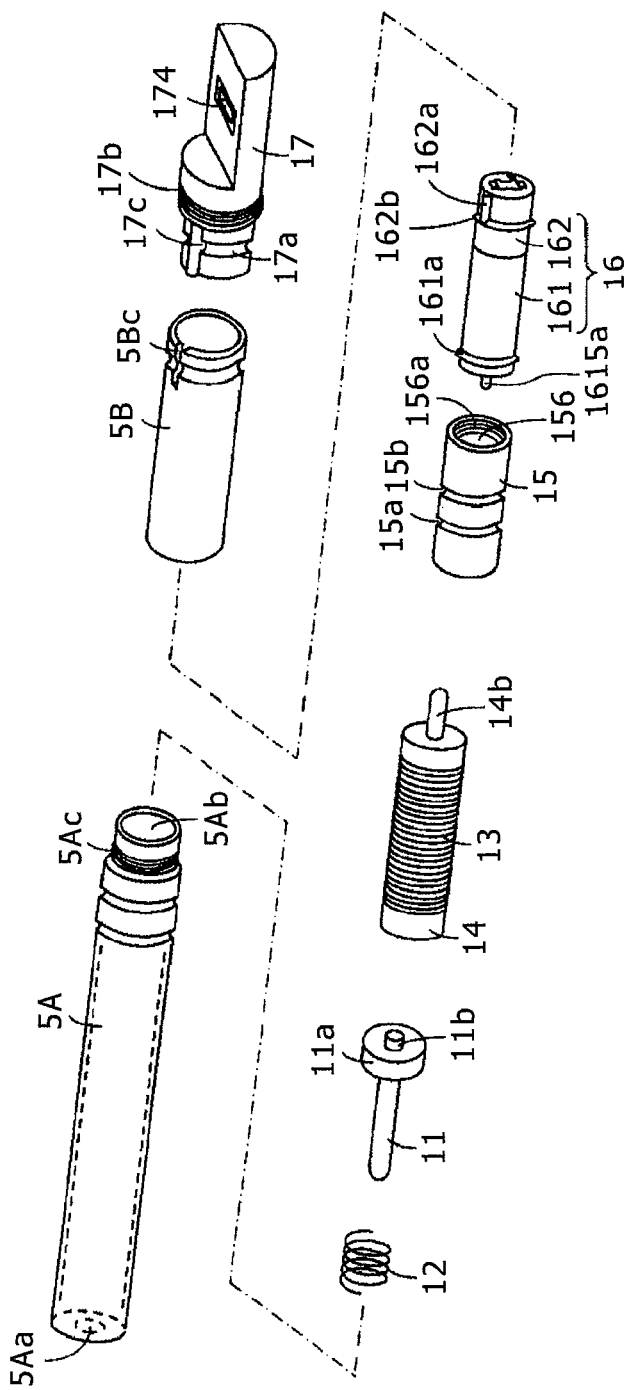
FIG. 1A
FIG. 1B

FIG.6A   FIG.6B   FIG.6C
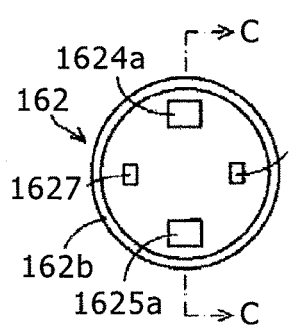
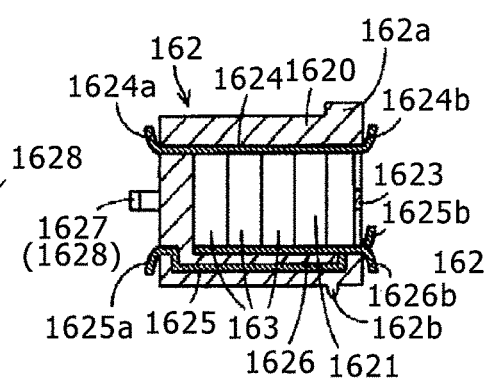
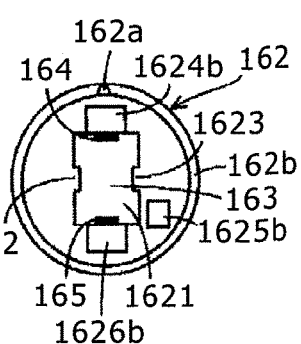
FIG.6D
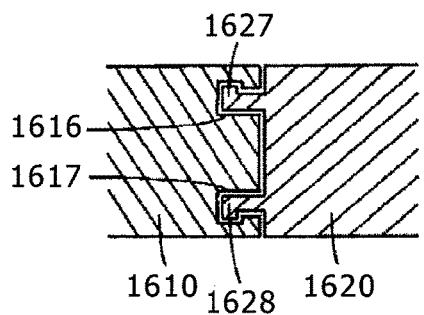

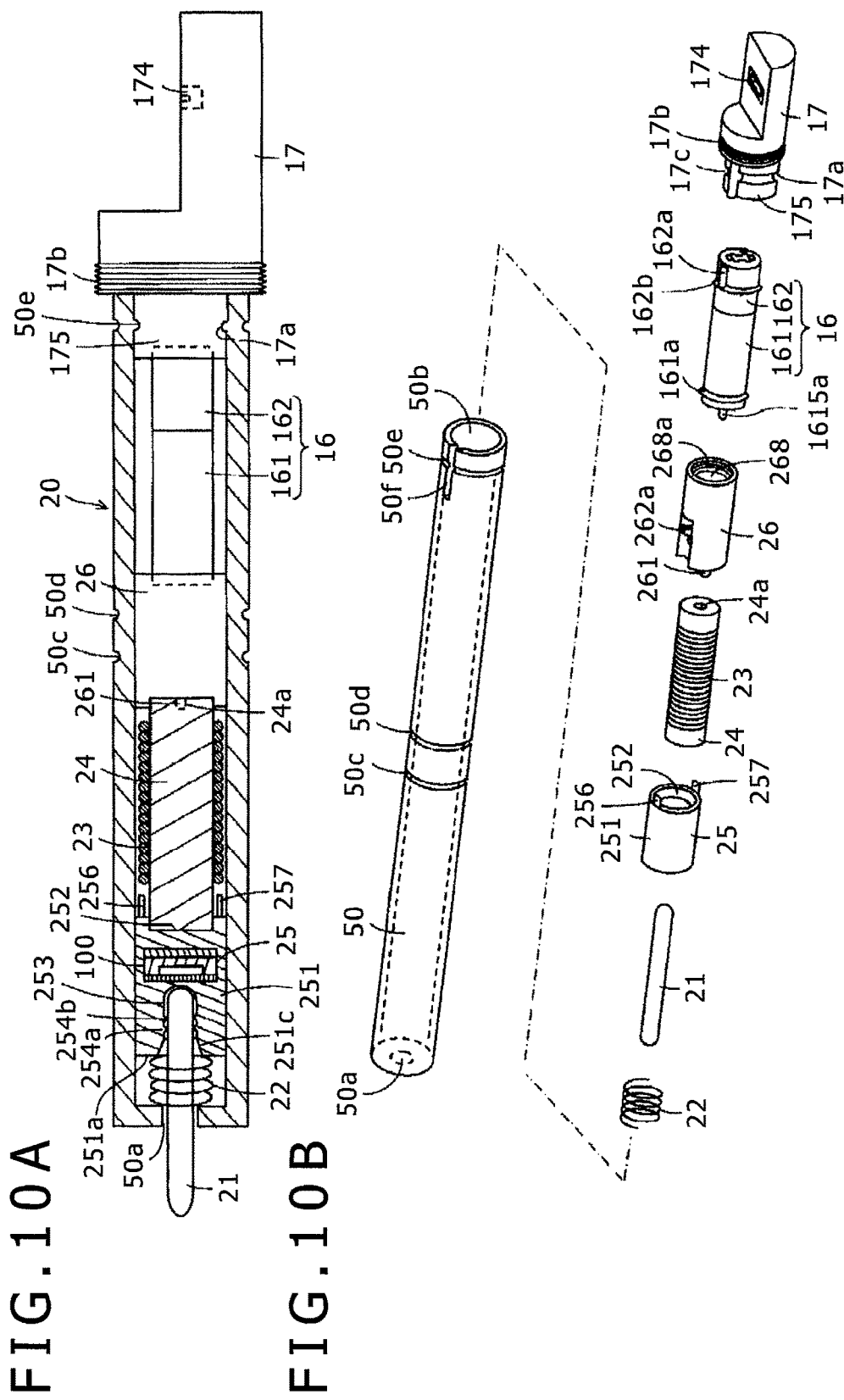

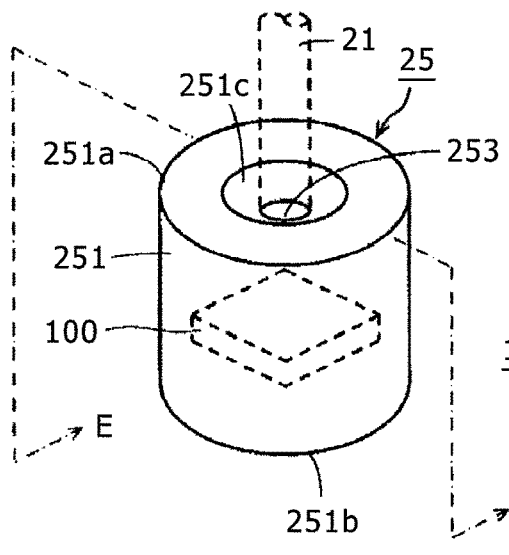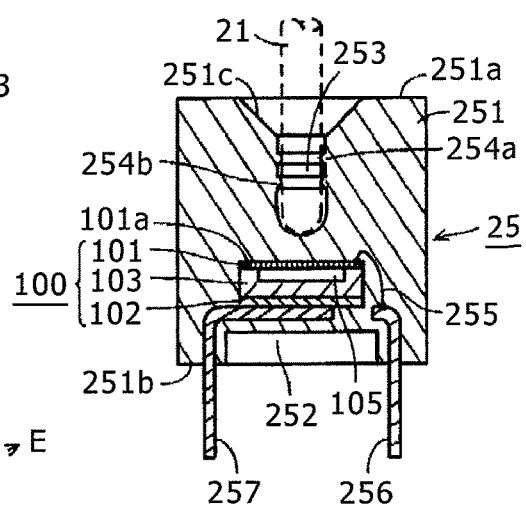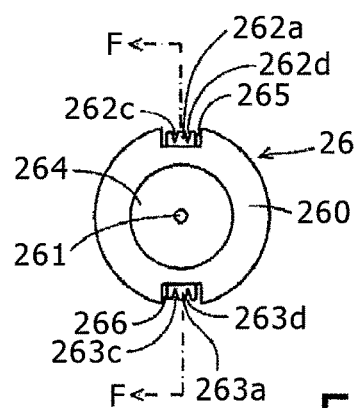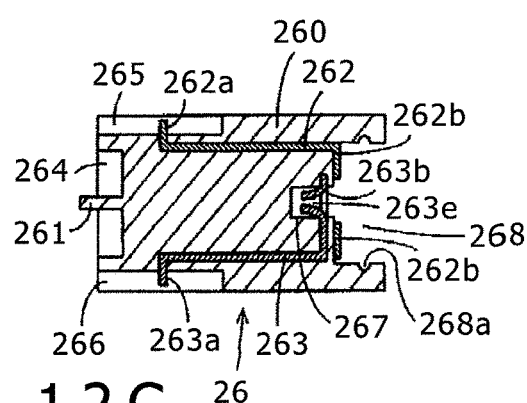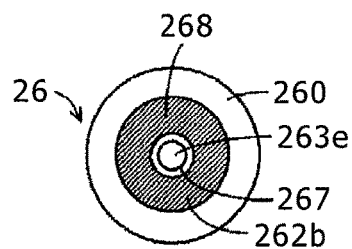

POSITION INDICATOR OF ELECTROMAGNETIC INDUCTION SYSTEM AND ELECTRONIC INK CARTRIDGE

CROSS-REFERENCE TO RELATED APPLICATION

The present application claims priority under 35 U.S.C. 119(a) to Japanese Patent Application No. 2012-202085, filed Sep. 13, 2012, which is incorporated by reference herein.

BACKGROUND

Technical Field

The present invention relates to a position indicator of an electromagnetic induction system and an electronic ink cartridge housed in the position indicator of the electromagnetic induction system.

Description of the Related Art

As disclosed in Patent Document 1 (Japanese Patent Laid-Open No. 2002-244806), for example, a coordinate input device of an electromagnetic induction system includes: a position detecting device having a sensor formed by disposing a large number of loop coils in the direction of an X-axis as a coordinate axis and the direction of a Y-axis as a coordinate axis; and a position indicator in the shape of a pen, the position indicator having a resonance circuit including a coil as an example of an inductance element wound around a magnetic core and a capacitor.

The position detecting device supplies a transmission signal of a predetermined frequency to a loop coil of the sensor. The loop coil transmits the transmission signal as electromagnetic energy to the position indicator. The resonance circuit of the position indicator is configured to have a resonance frequency according to the frequency of the transmission signal. The resonance circuit stores the electromagnetic energy on the basis of electromagnetic induction action between the resonance circuit and the loop coil of the sensor. Then, the position indicator returns the electromagnetic energy stored in the resonance circuit to a loop coil of the sensor of the position detecting device.

The loop coil of the sensor detects the electromagnetic energy from the position indicator. The position detecting device detects the coordinate values in the X-axis direction and the Y-axis direction of a position indicated by the position indicator on the sensor on the basis of the position of the loop coil that supplied the transmission signal and the position of the loop coil that detected the electromagnetic energy from the resonance circuit of the position indicator.

A position indicator of this kind has a constitution for transmitting a force applied to the core body of the position indicator in the shape of a pen, that is, pen pressure, as a change in resonance frequency (or phase) of a resonance circuit to a position detecting device, so that the position detecting device can detect the pen pressure. A constitution that changes the capacitance of a capacitor forming the resonance circuit is known as an example of the constitution that changes the resonance frequency of the resonance circuit according to the pen pressure.

A position indicator using a variable capacitance type capacitor as described in Patent Document 2 (Japanese Patent Laid-Open No. Hei 4-96212), for example, is known as a conventional position indicator that detects pen pressure on the basis of a change in capacitance of a capacitor forming a resonance circuit. The variable capacitance type capacitor described in this Patent Document 2 includes, as mechanical structural parts housed within a cylindrical casing, a first conductor attached to one end surface of a cylindrical dielectric and a flexible second conductor capable of elastic displacement, the flexible second conductor being disposed on another end surface side of the dielectric, the another end surface side being opposite from the one end surface of the dielectric. A surface of the second conductor which surface is opposed to the dielectric has such a shape as to swell on the side of the dielectric in the form of a dome, for example.

The variable capacitance type capacitor described in Patent Document 2 also includes spacer means for separating the second conductor and the another end surface of the dielectric from each other by a small interval except for a part of the second conductor and the another end surface of the dielectric, and further includes a part for applying a relative pressure or displacement between the second conductor and the dielectric. The part for applying the relative pressure or displacement is coupled to a core body of the position indicator in the shape of a pen. When a pen pressure is applied to the position indicator from one end part of the casing of the position indicator, the force in an axial direction which force is applied to the core body displaces the flexible second conductor to the dielectric side, and thus displaces the second conductor so as to touch the another end surface of the dielectric. Then, the swelling end surface of the flexible second conductor which swelling end surface is in the shape of a dome touches the another end surface of the dielectric with an area corresponding to the pressing force. Therefore a capacitance formed between the second conductor and the first conductor with the dielectric interposed therebetween changes.

PRIOR ART DOCUMENTS

Patent Documents

Patent Document 1
Japanese Patent Laid-Open No. 2002-244806
Patent Document 2
Japanese Patent Laid-Open No. Hei 4-96212

BRIEF SUMMARY

Problems to be Solved by the Invention

The conventional position indicator described above directly houses the constituent parts of the variable capacitance type capacitor within a space on the inside of the cylindrical casing in addition to constituent parts such as the core body, a ferrite core wound with a coil, a printed board, a board holder for retaining the printed board, and the like. Therefore, in order to assemble the position indicator, the above-described parts need to be put together in the direction of a central axis within the casing, which is not suitable for mass production.

The variable capacitance type capacitor of the position indicator in Patent Document 2, in particular, has a large number of parts, including the dielectric, the first electrode, the second electrode, the spacer, an elastic body, a holding body for holding the dielectric, terminal members for connecting the first and second electrodes to the printed wiring board, and the like. In addition, each of the parts is a separate part. Therefore, the constitution of the position indicator is more complex, and the assembly of the position indicator requires time, thus resulting in high cost.

In addition, in the case of the conventional constitution, the resonance frequency of the resonance circuit which resonance frequency is determined by the coil and the capacitor needs to be adjusted after the constituent parts are housed and positioned within the cylindrical casing. For this purpose, a trimmer capacitor provided on the printed board is adjusted through a through hole for a push switch (side switch) provided in the casing of the position indicator. The adjustment thus takes time. In addition, such adjustment of the resonance frequency needs to be made after the assembly of the position indicator is completed, and thus takes time and makes mass production difficult also in this respect.

In addition, there is a desire to thin the pen shape. However, with the conventional constitution, when thinning is realized, connection between parts further takes time, and thus requires a larger number of man-hours.

In view of the above-described problems, according to one aspect of the present invention, a position indicator of the electromagnetic induction system is provided, which has a simple constitution of parts within a casing, facilitates adjustment, and is suitable for thinning and mass production.

Means for Solving the Problems

In order to solve the above-described problems, according to embodiments of the present invention, there is provided an electronic ink cartridge of an electromagnetic induction system, the electronic ink cartridge including: a cylindrical body; a core body extended out from a distal end of the cylindrical body; a coupling member disposed on a side of a proximal end of the cylindrical body; a coil housed between the core body and the coupling member and housed in the cylindrical body, the coil having a predetermined inductance; and a pressure sensitive element that changes in capacitance in accordance to the pressure applied to the core body. One terminal and another terminal of the coil are electrically connected respectively to one terminal and another terminal of the pressure sensitive element to thereby form one terminal and another terminal, respectively, of a resonance circuit that is formed by the coil and the pressure sensitive element. On a proximal end surface side of the coupling member, which is opposite from a distal end surface side of the coupling member that opposes the core body, a connecting terminal is provided that is electrically connected to at least one of the one terminal and the other terminal of the resonance circuit to be accessible from outside.

In the present specification, an electronic ink cartridge means a structure for housing at least a core body, a coil, a pressure sensitive element, and a coupling member among constituent parts of a position indicator within the hollow part of a cylindrical body of the electronic ink cartridge, to thereby house at least the core body, the coil, the pressure sensitive element, and the coupling member within the casing of the position indicator. The position indicator can be formed by merely housing the electronic ink cartridge, which houses all the main constituent parts of the position indicator within the hollow part of the cylindrical body, within the casing of the position indicator as in a case of an ink cartridge for a ballpoint pen as a writing instrument. Accordingly, in the present specification, a structure internally housing a part of or main constituent parts of a position indicator of the electromagnetic induction system within a cylindrical body will be referred to as an electronic ink cartridge.

In the electronic ink cartridge according to the present invention having the above-described constitution, the core body, the coil, the pressure sensitive element changing in capacitance so as to correspond to pressure applied to the core body, and the coupling member are disposed in the direction of the central axis of the cylindrical body, and at least the coil and the pressure sensitive element are (fully) housed in the cylindrical body. The position indicator of the electromagnetic induction system according to the present invention is formed by housing the electronic ink cartridge within the casing of the position indicator.

As described above, according to the present invention, the core body, the coil, the pressure sensitive element, and the coupling member, which are constituent parts necessary for the position indicator of the electromagnetic induction system, are all arranged in the direction of the central axis of the cylindrical body of the electronic ink cartridge, and at least the coil and the pressure sensitive element are (fully) housed in the electronic ink cartridge. Thus, the position indicator is housed within the casing in a simple manner. In addition, the electronic ink cartridge can be thinned, and therefore the position indicator as a whole can also be thinned.

In the electronic ink cartridge according to the present invention, a connecting terminal electrically connected to at least one of the one terminal and the other terminal of the coil forming the resonance circuit and/or at least one of the one terminal and the other terminal of the pressure sensitive element is provided on the proximal end surface side of the coupling member on the side opposite from the core body side of the coupling member.

Therefore, when the core body, the coil, and the pressure sensitive element are housed in the cylindrical body of the electronic ink cartridge, the connecting terminal disposed on the proximal end surface of the coupling member, which opposes a capacitor, is exposed. The resonance frequency of the resonance circuit formed by the coil and the pressure sensitive element disposed within the electronic ink cartridge (or the characteristic value of at least one of the inductance of the coil and the capacitance of the pressure sensitive element) can be measured using the connecting terminal disposed on the proximal end surface of the coupling member. The resonance frequency of the resonance circuit is determined by the inductance of the coil and the capacitance of the pressure sensitive element. Thus, when the resonance frequency of the resonance circuit formed by the coil and the pressure sensitive element disposed within the electronic ink cartridge in the same state as an actual state of use of the position indicator is measured, the capacitance of the capacitor for setting the position indicator to a desired resonance frequency can be calculated.

Then, a suitable capacitor having a predetermined capacitance so as to set the desired resonance frequency in the position indicator is electrically connected to the coil via the coupling member so as to form a parallel resonance circuit, and the capacitor is housed in the electronic ink cartridge. Alternatively, the capacitor is coupled to the electronic ink cartridge, and disposed on the outside of the electronic ink cartridge. Then, the electronic ink cartridge is housed within the casing of a position indicator to form the position indicator of the electromagnetic induction system according to the present invention.

Hence, according to the position indicator of the present invention, the capacitance of the capacitor for setting the desired resonance frequency in the position indicator can be obtained in a state of the electronic ink cartridge being housed within the casing of the position indicator. Therefore, in order to set the resonance frequency of the position indicator to the desired value, it is not necessary to adjust the resonance frequency of the position indicator after housing the electronic ink cartridge in the casing of the position indicator, unlike the conventional position indicator that requires the work of adjusting the capacitance of the capacitor after the position indicator is assembled. In addition, in the present invention, mechanical coupling is achieved by merely housing each constituent part of the electronic ink cartridge in the direction of the central axis, and the one terminal and the other terminal of the coil, the one terminal and the other terminal of the pressure sensitive element, and one terminal and another terminal of the capacitor are respectively connected to each other by the coupling member, whereby the coil, the pressure sensitive element, and the capacitor are electrically connected in parallel with each other. Thus, a constitution suitable also for mass production is provided.

Effects of the Invention

According to some embodiments of the present invention, it suffices to arrange and house at least the core body, the pressure sensitive element, and the coil, which are constituent parts necessary for the position indicator of the electromagnetic induction system, in the direction of the central axis within the cylindrical body of the electronic ink cartridge. The constitution is thus simplified. In addition, because each of the constituent parts is disposed within the electronic ink cartridge in the same state as an actual state of use of the position indicator, the capacitance of the capacitor for the desired resonance frequency to be set in the position indicator can be calculated at a point in time that each of the constituent parts is housed in the electronic ink cartridge. Therefore, the need to adjust the capacitance of the capacitor after assembling the position indicator is eliminated, and a constitution suitable also for mass production is provided. In addition, the electronic ink cartridge can be thinned, and therefore the position indicator as a whole can also be thinned.

BRIEF DESCRIPTION OF THE DRAWINGS

FIGS. 1A and 1B are diagrams of assistance in explaining an example of constitution of a first embodiment of an electronic ink cartridge according to the present invention.

FIGS. 6A, 6B, 6C, and 6D are diagrams of assistance in explaining an example of constitution of a part of the first embodiment of the electronic ink cartridge according to the present invention.

FIGS. 10A and 10B are diagrams of assistance in explaining an example of constitution of a second embodiment of the electronic ink cartridge according to the present invention.

FIGS. 11A and 11B are diagrams of assistance in explaining an example of constitution of a part of the second embodiment of the electronic ink cartridge according to the present invention.

FIGS. 12A, 12B, and 12C are diagrams of assistance in explaining an example of constitution of a part of the second embodiment of the electronic ink cartridge according to the present invention.

DETAILED DESCRIPTION

First Embodiment

FIGS. 1A to 9 are diagrams of assistance in explaining an example of configuration of a first embodiment of a position indicator of an electromagnetic induction system according to the present invention. In the position indicator according to the first embodiment, a capacitance that changes according to a pressing force applied to a core body is connected in parallel with a coil as an inductance element to form a resonance circuit. The position indicator according to the first embodiment transmits a resonance frequency that changes according to the change in the capacitance of the resonance circuit to a position detecting device, so that the position detecting device can detect the pressing force applied to the core body, that is, pen pressure. In the position indicator according to the first embodiment, a pressure sensitive element having the capacitance that changes according to the pressing force applied to the core body is formed by a pressure sensing semiconductor device manufactured by MEMS (Micro Electro Mechanical System) technology.

In addition, the position indicator according to the first embodiment includes a push switch that is turned on and off by a depression operating element provided in a circumferential surface of a casing. The position indicator according to the first embodiment has a configuration such that the resonance frequency of the resonance circuit is changed by turning on and off the push switch. Incidentally, this push switch is provided at a position close to the core body and in a circumferential portion of the casing, and is referred to also as a side switch.

As will be described later, the push switch changes the resonance frequency of the resonance circuit by selecting a plurality of capacitors provided as a capacitor forming the resonance circuit together with the coil. The position indicator according to the present embodiment transmits a change in the resonance frequency according to the turning on or off of the push switch as a phase (resonance frequency) of an electromagnetic induction signal from the coil of the resonance circuit to the position detecting device.

The position detecting device can detect an operation of the push switch of the position indicator by detecting a change in the phase (frequency) of the electromagnetic induction signal from the position indicator, which electromagnetic induction signal is received by a loop coil. Incidentally, the operation of turning on and off the push switch which operation is detected by the position detecting device is assigned to various functions such as a determining operating input, for example, in an electronic device such as a personal computer incorporated in the position detecting device or externally connected to the position detecting device.

Figure 2A:
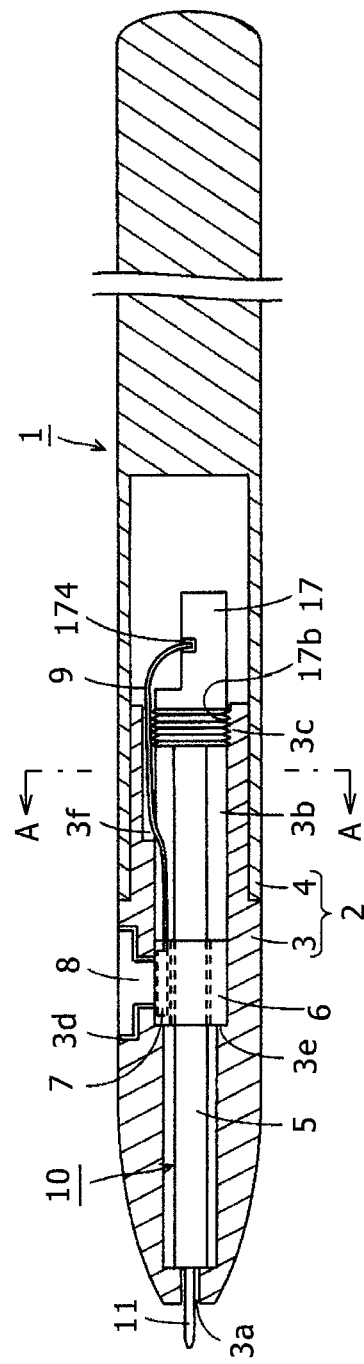
FIGS. 2A, 2B, and 2C are diagrams showing an example of constitution of a first embodiment of a position indicator according to the present invention.

FIG. 2A schematically shows a constitution of the entire position indicator 1 according to the first embodiment. The position indicator 1 has a pen shape. Constituent parts of the position indicator are housed in an internal space within a cylindrical casing 2. FIG. 2A shows the casing 2 of the position indicator 1 in cross-section in order to facilitate understanding of the constitution within the casing 2.

The casing 2 of the position indicator 1 according to the first embodiment includes a cylindrical first case member 3 formed of a non-magnetic material, for example a resin, and having an opening 3a on the pen point side of the casing 2, and a cylindrical second case member 4 coupled to the first case member 3 by concentrically fitting the first case member 3 into the second case member 4.

The first case member 3 has therewithin a hollow part 3b having a circular cross-sectional shape, for example. As shown in FIGS. 1A and 1B, a cylindrical body 5 housing basic constituent parts of the position indicator of the electromagnetic induction system is housed within the hollow part 3b such that the direction of the central axis of the cylindrical body 5 is the direction of the central axis of the casing 2. The cylindrical body 5 is formed of a non-magnetic material such as a non-magnetic metal, a resin material, glass or ceramic, or for example a material such as SUS305 or SUS310S in the present example.

The basic constituent parts of the position indicator of the electromagnetic induction system, which basic constituent parts are housed in the cylindrical body 5 include: a core body 11; a coil 13 wound around a ferrite core 14, which is a magnetic material, as an example of the inductance element forming the resonance circuit; a pressure sensing semiconductor device 15 of the capacitance system as an example of the pressure sensitive element; and a capacitor circuit 16 including the capacitor forming the resonance circuit with the coil 13.

In the first embodiment, the position indicator 1 can be formed by merely housing the cylindrical body 5 within the casing 2, as in a case of an ink cartridge for a ballpoint pen as a writing instrument. In addition, the cylindrical body 5 in the casing 2 can be replaced. Accordingly, as has also been described earlier, a structure formed by housing main constituent parts of a position indicator of the electromagnetic induction system within a cylindrical body will be referred to as an electronic ink cartridge in the present specification.

Example of Constitution of Electronic Ink Cartridge

An example of constitution of an electronic ink cartridge 10 in the first embodiment will be described with reference to FIGS. 1A and 1B and FIGS. 3A to 9. FIG. 1A is a cross-sectional view of assistance in explaining an internal constitution of the electronic ink cartridge 10. However, for the convenience of description, part of constituent parts (the pressure sensing semiconductor device 15 and the capacitor circuit 16) within the cylindrical body 5 of the electronic ink cartridge 10 are not shown in cross-section in FIG. 1A, but separate sectional views are prepared for the constituent parts, as will be described later. FIG. 1B is an exploded perspective view of assistance in explaining the constitution of the entire electronic ink cartridge 10.

The cylindrical body 5 in the first embodiment includes a first cylindrical body 5A and a second cylindrical body 5B as two parts divided from each other in the direction of the central axis. In the present example, the first cylindrical body 5A and the second cylindrical body 5B each have a thin shape whose outside diameter is for example 2.5 mm and whose inside diameter is for example 1.5 mm to 2 mm.

An opening 5Aa, from which a distal end of the core body 11 extends, is provided on a distal end side in the direction of the central axis of the first cylindrical body 5A. The diameter of the opening 5Aa is smaller than the inside diameter of the first cylindrical body 5A. On the other hand, an opening 5Ab is formed over the entire inside diameter of a proximal end side in the direction of the central axis of the first cylindrical body 5A. In addition, the second cylindrical body 5B has an opening over the entire inside diameter of the second cylindrical body 5B on both distal and proximal end sides in the direction of the central axis of the second cylindrical body 5B.

As shown in FIG. 1A, a threaded part 5Ac to be screwed into a threaded part 5Ba formed in an inner wall surface of the opening on the distal end side of the second cylindrical body 5B is formed in an outer circumferential side surface of the first cylindrical body 5A on the proximal opening 5Ab side. In addition, a ring-shaped projection part 5Bb to be fitted into a ring-shaped groove part 17a formed in part of an outer circumference of a cap 17 formed of a non-magnetic material such as a resin is formed on an inner wall surface in the vicinity of the opening on the proximal end side of the second cylindrical body 5B, by squeezing the second cylindrical body 5B at the position of the ring-shaped projection part 5Bb, for example. In addition, a cut-out 5Bc for positioning in a circumferential direction is formed along the direction of the central axis in a predetermined position in the circumferential direction of a circumferential side surface on the side of the opening on the proximal end side of the second cylindrical body 5B.

A projection part 17c to be engaged with the cut-out 5Bc of the second cylindrical body 5B is formed on the cap 17. While the cap 17 is positioned in the circumferential direction by being pushed into the second cylindrical body 5B such that the projection part 17c is inserted into the cut-out 5Bc, the ring-shaped projection part 5Bb is fitted into the ring-shaped groove part 17a of the cap 17. Thus, the cap 17 is locked to the inside of the second cylindrical body 5B, and the position of the cap 17 is regulated such that the cap 17 does not move in the direction of the central axis.

As shown in FIG. 1A and FIG. 1B, as viewed from the distal opening 5Aa, a coil spring 12, the core body 11, the ferrite core 14 as an example of the magnetic material around which the coil 13 is wound, and the pressure sensing semiconductor device 15 are arranged in this order in the direction of the central axis of the first cylindrical body 5A, and housed within the first cylindrical body 5A, such that the central axes of the respective parts coincide with each other.

As will be described later, the pressure sensing semiconductor device 15 in the first embodiment not only includes a pressure sensitive chip 100 of the capacitance system but also plays a role of a coupling member for mechanically coupling the ferrite core 14 and the capacitor circuit 16 to each other and electrically connecting the coil 13 and the capacitor circuit 16 to each other.

Figure 3A:
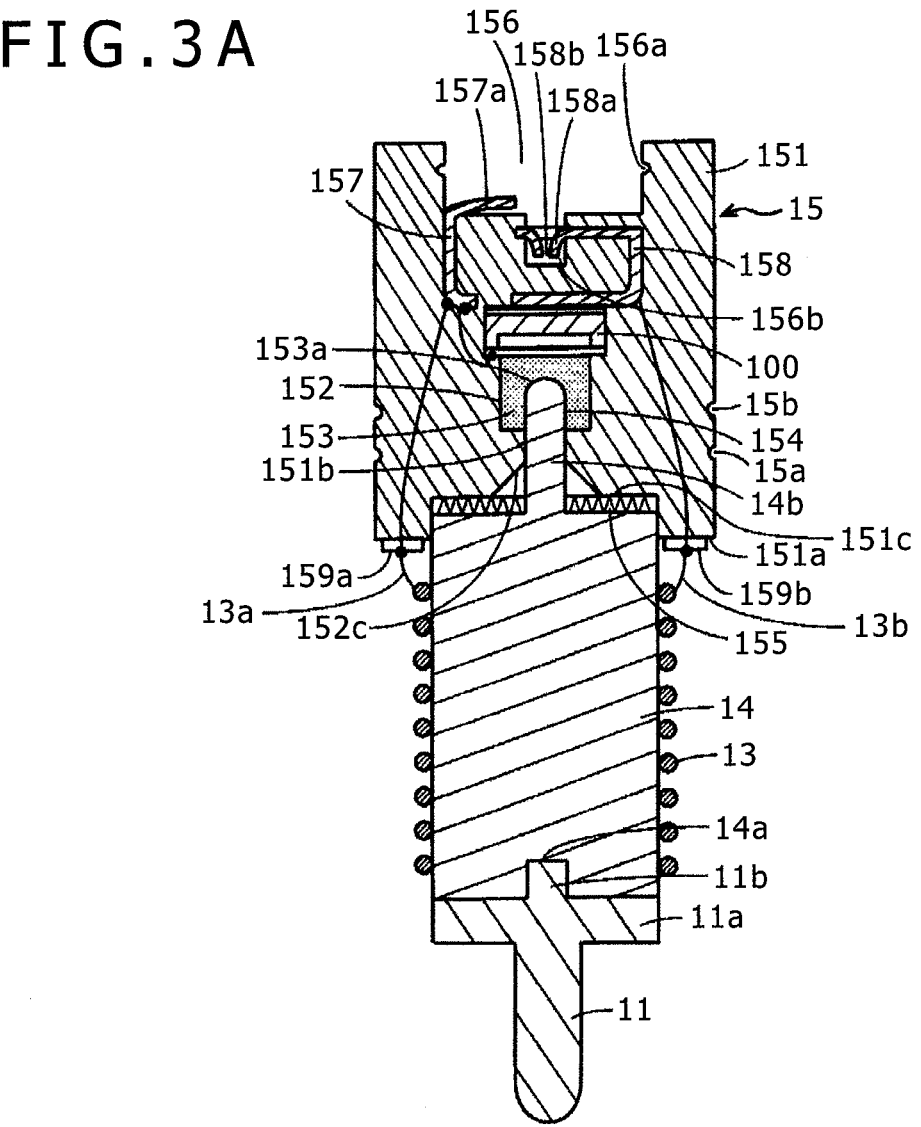
FIGS. 3A and 3B are diagrams of assistance in explaining an example of constitution of a part of the first embodiment of the electronic ink cartridge according to the present invention.

As shown in FIGS. 1A and 1B and FIG. 3A, the pressure sensing semiconductor device 15 has a cylindrical shape, and has ring-shaped depression grooves 15a and 15b formed at predetermined positions in the direction of the central axis of an outer circumferential surface of the pressure sensing semiconductor device 15. Ring-shaped projection parts 5Ad and 5Ae projecting on the inner wall surface side of the first cylindrical body 5A are formed on the first cylindrical body 5A by for example squeezing an outer circumferential surface of the first cylindrical body 5A into a ring shape at positions in the direction of the central axis of the first cylindrical body 5A to which positions the ring-shaped depression grooves 15a and 15b correspond when the pressure sensing semiconductor device 15 is housed in the first cylindrical body 5A.

Therefore, when the pressure sensing semiconductor device 15 is inserted in the direction of the central axis into the first cylindrical body 5A, the pressure sensing semiconductor device 15 is locked by the fitting of the ring-shaped projection parts 5Ad and 5Ae on the inner wall surface of the first cylindrical body 5A into the ring-shaped depression grooves 15a and 15b in the outer circumferential surface of the pressure sensing semiconductor device 15. The pressure sensing semiconductor device 15 is thus positioned in the direction of the central axis of the pressure sensing semiconductor device 15 within the first cylindrical body 5A. Incidentally, in the present example, the ring-shaped projection parts 5Ad and 5Ae on the inner wall surface of the first cylindrical body 5A are formed at positions such that a proximal end surface of the pressure sensing semiconductor device 15 on a side where the pressure sensing semiconductor device 15 is to be coupled to the capacitor circuit 16 is flush with a proximal end surface of the opening 5Ab of the first cylindrical body 5A.

Then, in the first embodiment, the capacitor circuit 16 is coupled to the pressure sensing semiconductor device 15 in the direction of the central axis of the pressure sensing semiconductor device 15, and in the present embodiment, the second cylindrical body 5B housing the capacitor circuit 16 is screwed on the first cylindrical body 5A at the threaded parts 5Ac and 5Ba. Then, the cap 17 is inserted into the second cylindrical body 5B to close the opening of the second cylindrical body 5B, whereby the assembly of the cylindrical body 5 is completed.

Constitutions of Parts within Cylindrical Body of Electronic Ink Cartridge

The core body 11 in the present embodiment is formed of a resin, for example, and has an end part extended out from the opening 5Aa of the first cylindrical body 5A. In addition, the core body 11 has a flange part 11a whose diameter is larger than that of the opening 5Aa so that the core body 11 does not fall out of the opening 5Aa and whose diameter is slightly smaller than the inside diameter of the first cylindrical body 5A so that the core body 11 can move within the first cylindrical body 5A in the direction of the central axis.

The core body 11 has a projection part 11b at substantially the center of an upper (proximal) surface of the flange part 11a.

The ferrite core 14 has a cylindrical shape. The diameter of the ferrite core 14 in a state of being wound with the coil 13, which diameter includes also the part of the coil 13, is equal to or slightly smaller than the inside diameter of the first cylindrical body 5A. A depression part 14a, for receiving the projection part 11b formed on the upper surface of the flange part 11a of the core body 11, is provided in a distal end surface in the direction of the central axis of the ferrite core 14 on the side of the core body 11. The core body 11 is fixed to the ferrite core 14 by fitting the projection part 11b on the flange part 11a of the core body 11 into the depression part 14a of the ferrite core 14 and further bonding the core body 11 to the ferrite core 14 with an adhesive.

In addition, as will be described later, a pressing projection part 14b for applying a pressing force to the pressure sensitive chip 100 included in the pressure sensing semiconductor device 15 is formed on the center of a proximal end surface in the direction of the central axis of the ferrite core 14 on the side of the pressure sensing semiconductor device 15.

Example of Constitution of Pressure Sensing Semiconductor Device

As described above, the position indicator 1 according to the first embodiment detects pen pressure as a change in the capacitance of a capacitor possessed by the pressure sensitive element, which capacitor forms the resonance circuit together with the coil. However, in the position indicator 1 according to the first embodiment, instead of pen pressure being detected using a variable capacitor formed by a combination of a plurality of parts as described in the background above, a semiconductor device (pressure sensitive chip) manufactured by the MEMS technology, which semiconductor device has been previously proposed by the present applicant in Japanese Patent Application No. 2012-15254, is used as the pressure sensitive element.

Figure 3B:
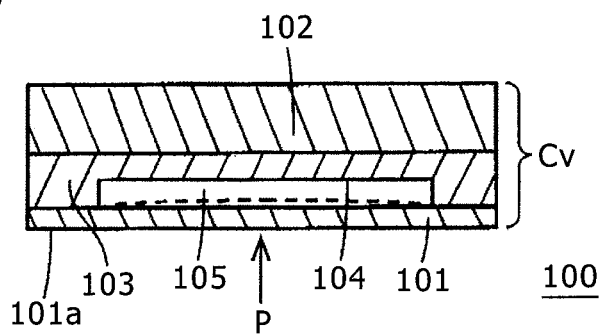

FIGS. 3A and 3B are diagrams of assistance in explaining a constitution of the pressure sensing semiconductor device 15 in the present example. FIG. 3A is a longitudinal cross-sectional view of a part formed as a resonance circuit unit by coupling the core body 11, the ferrite core 14 wound with the coil 13, and the pressure sensing semiconductor device 15 to each other. FIG. 3B is a diagram of assistance in explaining the pressure sensitive chip 100 housed in the pressure sensing semiconductor device 15.

As shown in FIG. 3A, the pressure sensing semiconductor device 15 houses the pressure sensitive chip 100 within a package member 151 formed of a resin, for example, such that the pressure sensitive chip 100 can be pressed by an external pressing member. The pressing member in the present example is the pressing projection part 14b of the ferrite core 14. The pressure sensing semiconductor device 15 in the present example has a unitized structure where the ferrite core 14 to which the core body 11 is coupled and which is wound with the coil 13 is retained by the package member 151 to form an integrated structure.

As described above, the pressing projection part 14b is formed on the proximal end surface of the solid ferrite core 14 in a cylindrical shape on the side of the pressure sensing semiconductor device 15. In the present example, the diameter of a part of the ferrite core 14, which part is wound with the coil 13, is 2 mm, for example, and the diameter of the pressing projection part 14b is 1 mm, for example.

The pressing projection part 14b of the ferrite core 14 is inserted, as the pressing member for transmitting pressure corresponding to pen pressure, into the pressure sensing semiconductor device 15. In the present example, as shown in FIG. 3A and FIG. 3B, part of the ferrite core 14 wound with the coil 13 is also retained within the package member 151 of the pressure sensing semiconductor device 15 so as to be able to move in the direction of the central axis of the cylindrical body.

The constitution of the pressure sensing semiconductor device 15 in the present example will next be described.

The pressure sensing semiconductor device 15 in the present example is formed by for example sealing the pressure sensitive chip 100 formed as a semiconductor element manufactured by the MEMS technology within the package member 151 in a cylindrical shape, for example (see FIG. 3A). In the present example, the package member 151 of the pressure sensing semiconductor device 15 is formed so as to function as a mechanical and electrical coupling member for coupling the ferrite core 14 wound with the coil 13 and the capacitor circuit 16 to each other.

As shown in FIG. 3B, the pressure sensitive chip 100 in the present example includes a first electrode 101, a second electrode 102, and an insulating layer (dielectric layer) 103 between the first electrode 101 and the second electrode 102. The first electrode 101 and the second electrode 102 are formed by a conductor made of single crystal silicon (Si). The insulating layer 103 in the present example is formed by an insulating film made of oxide film ($SiO_2$).

A circular depression part 104, for example, is formed in the insulating layer 103, so that a space 105 is formed between the insulating layer 103 and the first electrode 101. The bottom surface of the depression part 104 is a flat surface, and the diameter R of the depression part 104 is R=1 mm, for example. The depth of the depression part 104 in the present example is about a few tens of microns to a few hundreds of microns. The first electrode 101 can be displaced so as to be bent in the direction of the space 105 when pressed from the side of a surface 101a.

The pressure sensitive chip 100 formed as described above is a capacitor having a capacitance Cv formed between the first electrode 101 and the second electrode 102. As shown in FIG. 3B, when a pressure P is applied to the first electrode 101 from the side of the surface 101a of the first electrode 101, the first electrode 101 is bent as indicated by a dotted line in FIG. 3B, and a distance between the first electrode 101 and the second electrode 102 is shortened, and thus changed so as to increase the value of the capacitance Cv. The amount of bending of the first electrode 101 changes according to the magnitude of the applied pressure P. Hence, the capacitance Cv changes according to the magnitude of the pressure P applied to the pressure sensitive chip 100. The pressure can be detected by measuring the capacitance Cv.

In the pressure sensing semiconductor device 15 according to the present embodiment, the pressure sensitive chip 100 having the constitution as described above is housed within the package member 151 such that the surface 101a of the first electrode 101 that receives the pressure faces toward an upper (distal) surface 151a of the package member 151.

The package member 151 in the present example is formed of an electrically insulative material such as a ceramic material or a resin material. A depression part 152 corresponding to the area of the first electrode 101 is provided in an upper part within the package member 151 which upper part is on the side of the surface 101a of the first electrode 101 that receives pressures for the pressure sensitive chip 100. An elastic member 153 is filled and disposed within the depression part 152. The elastic member 153 in the present example is formed of a silicon resin.

A communicating hole 154 that extends from the upper surface 151a to part of the elastic member 153 is formed in the package member 151. That is, a through hole 151b forming part of the communicating hole 154 is formed in the package member 151, and a depression hole 153a forming an end part of the communicating hole 154 is provided in the elastic member 153. In addition, a tapered part 152c is formed on the side of an opening part of the communicating hole 154 in the package member 151 (on the side of the upper surface 151a), so that the opening part of the communicating hole 154 has a trumpet-like shape.

As shown in FIG. 3A, the pressing projection part 14b of the ferrite core 14 is inserted into the communicating hole 154 in the pressure sensing semiconductor device 15 while guided by the tapered part 152c. The pressure P corresponding to the pen pressure applied to the core body 11 as a pen point part is transmitted in the direction of the central axis of the ferrite core 14. The pressure P is applied to the pressure sensitive chip 100 in the pressure sensing semiconductor device 15 via the elastic member 153.

Incidentally, in the present example, the inside diameter of the through hole 151b of the package member 151 is slightly larger than the diameter of a part of the pressing projection part 14b of the ferrite core 14 which part abuts against the through hole 151b, and the inside diameter of the depression hole 153a of the elastic member 153 is slightly smaller than the diameter of a part of the pressing projection part 14b of the ferrite core 14 which part abuts against the depression hole 153a. Therefore, the pressing projection part 14b of the ferrite core 14 is elastically retained in the depression hole 153a of the elastic member 153 by the elastic member 153. That is, when the pressing projection part 14b of the ferrite core 14 is attached to the communicating hole 154 in the pressure sensing semiconductor device 15 by insertion, the pressing projection part 14b of the ferrite core 14 is retained so as not to be easily detached from the pressure sensing semiconductor device 15.

The package member 151 of the pressure sensing semiconductor device 15 in the present example also has a depression part 151c, which is configured to receive and retain part of the coil-wound part of the ferrite core 14, on the side of the upper surface 151a of the package member 151. The package member 151 retains the ferrite core 14 with the pressing projection part 14b of the ferrite core 14 inserted in the communicating hole 154 of the package member 151 and with part of the coil-wound part of the ferrite core 14 fitted in the depression part 151c.

In this case, in order not to limit the bending of the first electrode 101 of the pressure sensitive chip 100 in the direction of the space 105 by the pressing projection part 14b of the ferrite core 14 with applied pressure, a cushion member 155 is provided between a stepped part formed by the coil-wound part and the pressing projection part 14b of the ferrite core 14, and a bottom part of the depression part 151c of the package member 151 of the pressure sensing semiconductor device 15. Incidentally, the package member 151 can also be formed of the same material as the elastic member 153, for example a silicon resin.

In addition, the ring-shaped depression grooves 15a and 15b for receiving the ring-shaped projection parts 5Ad and 5Ae on the inner circumferential surface of the first cylindrical body 5A are formed in the outer circumferential surface of the package member 151, as described above. When the pressure sensing semiconductor device 15 unitized in conjunction with the ferrite core 14 to which the core body 11 is joined and which is wound with the coil 13 is inserted into the first cylindrical body 5A, as shown in FIG. 1A, the pressure sensing semiconductor device 15 is locked so as not to move in the direction of the central axis with respect to the first cylindrical body 5A. As a result, the unitized pressure sensing semiconductor device 15 is positioned in the direction of the central axis of the pressure sensing semiconductor device 15 within the first cylindrical body 5A. In this case, in the present example, the proximal end surface of the pressure sensing semiconductor device 15 on the side where the pressure sensing semiconductor device 15 is coupled to the capacitor circuit 16 is at such a position as to be flush with the proximal end surface of the opening 5Ab of the first cylindrical body 5A. At this time, an end part 157a of a terminal member 157 and an insertion hole 158b defined through an end part 158a of a terminal member 158, both on the bottom surface of a depression part 156, are exposed to the outside.

When a pressing force is applied to the core body 11 in the direction of the central axis, that is, pen pressure is applied in a state in which the unitized pressure sensing semiconductor device 15 is locked to the inside of the first cylindrical body 5A as described above, the ferrite core 14 presses the pressure sensitive chip 100 via the elastic member 153 of the pressure sensing semiconductor device 15 with a pressure corresponding to the pen pressure. As described above, the capacitance Cv of the pressure sensitive chip 100 changes according to the pen pressure transmitted to the pressure sensitive chip 100.

In this case, in the present example, the pressure sensitive chip 100 is not directly pressed by the pressing projection part 14b of the ferrite core 14, but the elastic member 153 is interposed between the pressing projection part 14b of the ferrite core 14 and the pressure sensitive chip 100. The interposition of the elastic member 153 improves a pressure resistance property and a shock resistance property of the pressure sensitive chip 100 on the side where the pressure sensitive chip 100 receives pressure, and prevents the side of the surface 101a of the pressure sensitive chip 100 from being damaged by an excessive pressure, an unexpected instantaneous pressure, or the like.

The depression part 156 that receives the capacitor circuit 16 in the direction of the central axis is formed on the opposite side of the package member 151 from the side where the package member 151 is engaged with the ferrite core 14. The depression part 156 has an inside diameter substantially equal to the outside diameter of the capacitor circuit 16 in a cylindrical shape to be described later. A ring-shaped depression groove 156a for receiving a ring-shaped projection part 161a formed on a first capacitor circuit 161 to be described later of the capacitor circuit 16 is formed in a side wall of the depression part 156.

The terminal members 157 and 158 formed of an elastic conductor by insert molding are provided within the package member 151. These terminal members 157 and 158 are formed so as to be connected, respectively, to both ends 13a and 13b of the coil 13, the first electrode 101 and the second electrode 102 of the pressure sensitive chip 100, and one terminal and another terminal of the capacitor circuit 16.

Specifically, the end part 157a of the terminal member 157 connected to the first electrode 101 of the pressure sensitive chip 100 is led out so as to be exposed at the bottom surface of the depression part 156. An electric connection between the terminal member 157 and the first electrode 101 of the pressure sensitive chip 100 is established by a gold wire, for example, as shown in FIG. 3A. The end part 157a of the terminal member 157 is used to be electrically connected to one of the terminals of the capacitor circuit 16 to be described later.

In addition, a depression hole 156b is formed in the bottom surface of the depression part 156 of the package member 151. One end 158a of the terminal member 158 connected to the second electrode 102 of the pressure sensitive chip 100 is located in the depression hole 156b. The terminal member 158 is attached so as to be in contact with the second electrode 102 of the pressure sensitive chip 100, and is thereby electrically connected to the second electrode 102.

The insertion hole 158b, into which a rod-shaped object can be inserted and which is defined through a bent part of an elastic conductive metal at the end part 158a of the terminal member 158, is provided for the depression hole 156b. As will be described later, the capacitor circuit 16 has, as the other terminal thereof, one end part 1615a (rod-shaped object) of a terminal member 1615 of the first capacitor circuit 161. The rod-shaped object as the other terminal of the capacitor circuit 16 is inserted into the insertion hole 158b, which is formed at the end part 158a of the terminal member 158 for the depression hole 156b, whereby the other terminal of the capacitor circuit 16 and the terminal member 158 are electrically connected to each other.

In the present example, as shown in FIG. 3A, terminals 159a and 159b electrically connected respectively to the terminal members 157 and 158 by gold wires, for example (indicated by thin solid lines in the figure) are provided on the upper surface 151a of the package member 151. The terminal 159a and the terminal 159b are connected respectively to one end 13a and the other end 13b of the coil 13 wound around the ferrite core 14.

When the capacitor circuit 16 is inserted into the depression part 156 of the package member 151 of the pressure sensing semiconductor device 15, one end 1614a of a terminal member 1614 to be described later as one terminal of the capacitor circuit 16 abuts against the end part 157a of the terminal member 157, whereby the one end 1614a of the terminal member 1614 and the end part 157a of the terminal member 157 are electrically connected to each other. In addition, at the same time, the one end 1615a forming the rod-shaped projection part of the terminal member 1615, which end serves as the other terminal of the capacitor circuit 16, is inserted into the insertion hole 158b so as to be in contact with the bent part of the elastic conductive metal that surrounds the insertion hole, whereby the other terminal of the capacitor circuit 16 and the terminal member 158 are electrically connected to each other. The ring-shaped projection part 161a of the capacitor circuit 16 is fitted into the ring-shaped depression groove 156a of the depression part 156 of the package member 151 of the pressure sensing semiconductor device 15, whereby the capacitor circuit 16 is locked to the package member 151.

With the above constitution, the capacitor circuit 16 is inserted and fitted into the depression part 156 of the resonance circuit unit in which the ferrite core 14, on which the core body 11 is disposed and which is wound with the coil 13, and the pressure sensing semiconductor device 15 are formed integrally with each other, whereby the one terminal and the other terminal of the capacitor circuit 16 are connected respectively to the one end 13a and the other end 13b of the coil 13, and are connected respectively to the first electrode 101 and the second electrode 102 of the pressure sensitive chip 100.

Example of Constitution of Capacitor Circuit 16

A constitution of the capacitor circuit 16 will next be described. FIGS. 4 to 6D are diagrams of assistance in explaining an example of constitution of the capacitor circuit 16 in the present embodiment.

Figure 4:
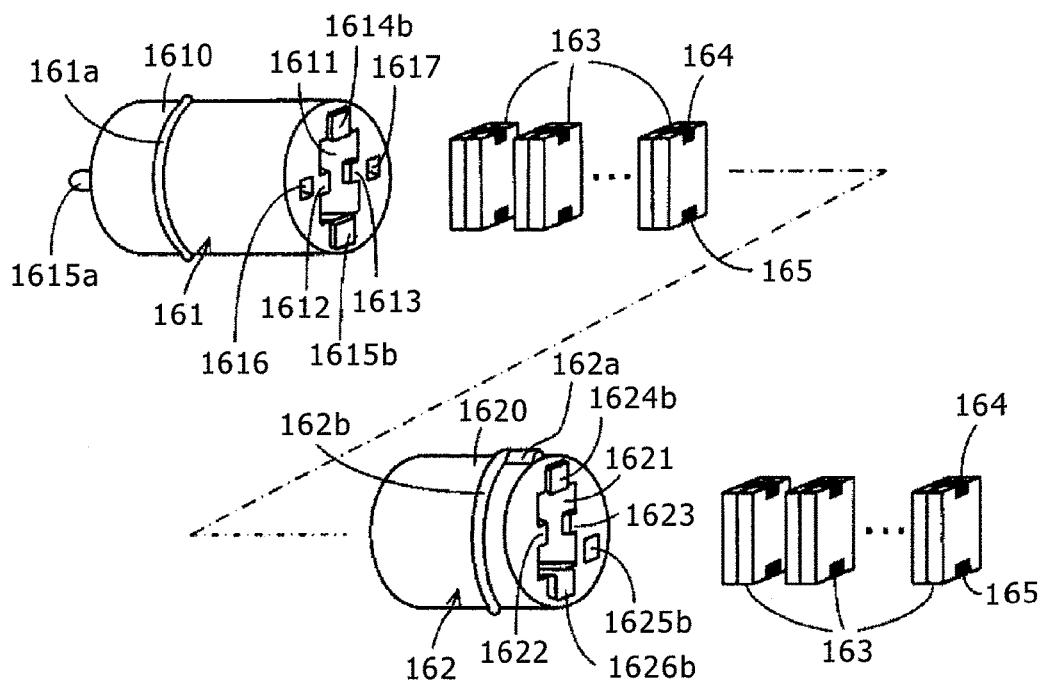
FIG. 4 is a diagram of assistance in explaining an example of constitution of a part of the first embodiment of the electronic ink cartridge according to the present invention.

As shown in FIGS. 1A and 1B and FIG. 4, the capacitor circuit 16 in the first embodiment has a constitution formed by coupling the first capacitor circuit 161 and a second capacitor circuit 162 to each other in the direction of the central axis. The first capacitor circuit 161 is connected in parallel with the coil 13 to form a resonance circuit. The second capacitor circuit 162 is connected in parallel with the first capacitor circuit 161 to form a resonance circuit when a push switch 7 is turned on, for example. The first capacitor circuit 161 and the second capacitor circuit 162 are provided to generate a first resonance frequency and a second resonance frequency so as to correspond to states of operation of the push switch 7. In the present example, when the push switch 7 does not need to be provided to the position indicator 1, a resonance frequency desired for the position indicator 1 is set by the first capacitor circuit 161. When the push switch 7 is disposed in the position indicator 1, the first resonance frequency is set by the first capacitor circuit 161 in a state in which the push switch 7 is off, and the second resonance frequency is set by connecting the second capacitor circuit 162 in parallel with the first capacitor circuit 161 in a state in which the push switch 7 is on.

As shown in FIG. 4, the first capacitor circuit 161 and the second capacitor circuit 162 have a plurality of chip capacitors 163 stacked on each other and housed within respective cylindrical holders 1610 and 1620 made of resin, for example. The first capacitor circuit 161 and the second capacitor circuit 162 are thereby connected in parallel with each other.

In the present example, a multilayer ceramic capacitor described in Japanese Patent Laid-Open No. 2009-124155, for example, is used as each of the chip capacitors 163. The chip capacitors 163 in the present example are formed in the shape of a rectangular parallelepiped. As represented by parts filled in with black in FIG. 4, in end surfaces in a direction orthogonal to the stacking direction of the capacitors which end surfaces are opposed to each other, first electrodes 164 and second electrodes 165 of the chip capacitors 163 are formed so as to be exposed over the entire end surfaces in the stacking direction of the capacitors.

When the chip capacitors 163 are stacked, the first electrodes 164 of the plurality of chip capacitors are connected to each other, and the second electrodes 165 of the plurality of chip capacitors are connected to each other. The chip capacitors 163 are thus connected in parallel with each other. The respective capacitances of the first capacitor circuit 161 and the second capacitor circuit 162 are determined by the value of capacitance of each of the chip capacitors 163 housed within the holders 1610 and 1620 and the numbers of chip capacitors 163 housed within the holders 1610 and 1620.

Incidentally, the values of the respective capacitances possessed by the first capacitor circuit 161 and the second capacitor circuit 162 are set in consideration of degrees of variation in the values of an inductance of the coil 13 and the capacitance of the capacitor possessed by the pressure sensing semiconductor device 15, as will be described later. When the numbers of chip capacitors 163 housed within hollow parts 1611 and 1621 are less than a predetermined number as a result of optimization of the capacitance values by stacking the chip capacitors 163, dummy chip capacitors having substantially no capacitance may be housed in the present example so that a predetermined number of chip capacitors are always housed within the hollow parts 1611 and 1621.

Figures 5A, 5B, 5C:
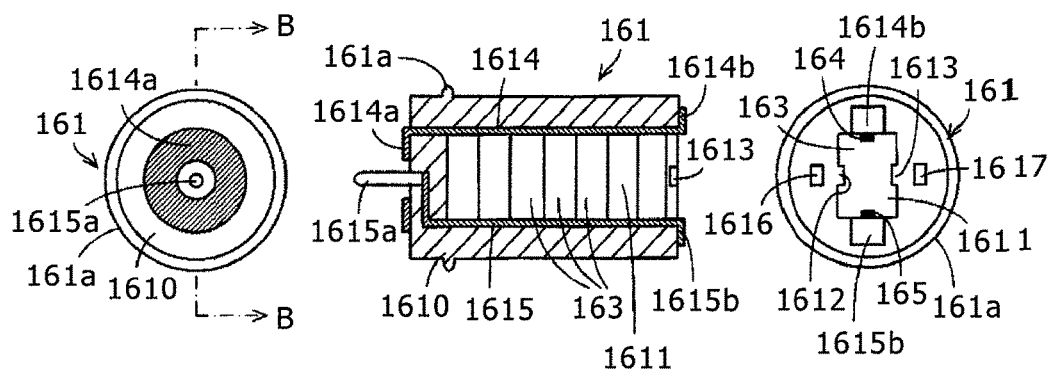
FIGS. 5A, 5B, and 5C are diagrams of assistance in explaining an example of constitution of a part of the first embodiment of the electronic ink cartridge according to the present invention.

FIGS. 5A to 5C show an example of constitution of the first capacitor circuit 161. FIG. 5A is a diagram showing an end surface of the first capacitor circuit 161 which end surface is opposed to the pressure sensing semiconductor device 15. FIG. 5B is a cross-sectional view taken along a line B-B of FIG. 5A. FIG. 5C is a diagram showing an end surface of the first capacitor circuit 161 which end surface is opposed to the second capacitor circuit 162. FIGS. 6A to 6C show an example of constitution of the second capacitor circuit 162. FIG. 6A is a diagram showing an end surface of the second capacitor circuit 162 which end surface is opposed to the end surface of the first capacitor circuit 161. FIG. 6B is a cross-sectional view taken along a line C-C of FIG. 6A. FIG. 6C is a diagram showing an end surface of the second capacitor circuit 162 which end surface is opposed to the cap 17.

As shown in FIG. 4, FIGS. 5A to 5C, and FIGS. 6A to 6C, the holder 1610 of the first capacitor circuit 161 and the holder 1620 of the second capacitor circuit 162 have the respective bottomed hollow parts 1611 and 1621 corresponding to the shape of the chip capacitors 163 in the direction of the central axis of the holder 1610 and the holder 1620.

In the present example, pawl parts 1612, 1613, 1622, and 1623 capable of being elastically deformed are provided on opening sides of the hollow parts 1611 and 1621 of the holders 1610 and 1620, the pawl parts 1612, 1613, 1622, and 1623 being formed so as to project from wall surfaces opposed to each other toward the hollow parts 1611 and 1621. The chip capacitors 163 go over the pawl parts 1612, 1613, 1622, and 1623 by elastically displacing the pawl parts 1612, 1613, 1622, and 1623, to be housed within the hollow parts 1611 and 1621. The pawl parts 1612, 1613, 1622, and 1623 are engaged with upper surfaces of uppermost chip capacitors of the plurality of chip capacitors 163 housed in the hollow parts 1611 and 1621, and thus lock the entire set of the plurality of chip capacitors 163 within the hollow parts 1611 and 1621.

As shown in FIG. 5B, a pair of the terminal members 1614 and 1615 are provided to the holder 1610 of the first capacitor circuit 161 so as to penetrate through both end surfaces in the direction of the central axis of the holder 1610. The terminal member 1614 is provided so as to be connected to all of the first electrodes 164 of the chip capacitors 163 housed in the hollow part 1611. The terminal member 1615 is provided so as to be connected to all of the second electrodes 165 of the chip capacitors 163 housed in the hollow part 1611.

As shown in FIG. 5A, the one end 1614a of the terminal member 1614 is formed as a ring-shaped electrode conductor, and is led out to the end surface side opposed to the pressure sensing semiconductor device 15. The one end 1614a of the terminal member 1614 as a ring-shaped electrode conductor is formed so as to abut against the electrode conductor 157a in the depression part 156 of the pressure sensing semiconductor device 15 and be thereby electrically connected to the electrode conductor 157a. As shown in FIGS. 5B and 5C, another end 1614b of the terminal member 1614 of the first capacitor circuit 161 is provided so as to be bent on the outside of the opening of the hollow part 1611 on the end surface side opposed to the second capacitor circuit 162.

As shown in FIGS. 5A and 5B, the one end 1615a of the terminal member 1615 of the first capacitor circuit 161 is led out as a rod-shaped object projecting from a central part of the end surface opposed to the pressure sensing semiconductor device 15. The one end 1615*a* is formed so as to be inserted into the insertion hole 158*b* defined through the terminal member 158, in the depression hole 156*b* of the depression part 156 of the pressure sensing semiconductor device 15, to be thereby electrically connected to the insertion hole 158*b*. As shown in FIGS. 5B and 5C, another end 1615*b* of the terminal member 1615 is provided so as to be bent on the outside of the opening of the hollow part 1611 on the end surface side opposed to the second capacitor circuit 162.

The ring-shaped projection part 161*a* to be fitted into the ring-shaped depression groove 156*a* formed in the inner wall of the depression part 156 of the pressure sensing semiconductor device 15 is formed on a part of an outer circumferential surface of the holder 1610 of the first capacitor circuit 161 which part is to be coupled to the pressure sensing semiconductor device 15.

As shown in FIG. 6B, terminal members 1624 and 1625 are provided to the holder 1620 of the second capacitor circuit 162 so as to penetrate through both end surfaces in the direction of the central axis of the holder 1620. The holder 1620 further includes a terminal member 1626.

The terminal member 1624 is provided so as to be connected to all of the first electrodes 164 of the chip capacitors 163 housed in the hollow part 1621. The terminal member 1625 is not connected to the chip capacitors 163 in the hollow part 1621, but is provided so as to penetrate through both end surfaces in the direction of the central axis of the holder 1620. The terminal member 1626 is provided so as to be connected to all of the second electrodes 165 of the chip capacitors 163 housed in the hollow part 1621. However, one end of the terminal member 1626 is present within the holder 1620 and is not exposed to the outside, while only another end 1626*b* of the terminal member 1626 is exposed to the outside.

As shown in FIGS. 6A and 6B, one end 1624*a* of the terminal member 1624 is led out to the end surface side opposed to the first capacitor circuit 161, and is formed so as to abut against the other end 1614*b* of the terminal member 1614 of the first capacitor circuit 161 and be thereby electrically connected to the other end 1614*b* of the terminal member 1614. As shown in FIGS. 6B and 6C, another end 1624*b* of the terminal member 1624 is provided so as to be bent on the outside of the opening of the hollow part 1621 on the end surface side opposed to an end surface of the cap 17.

As shown in FIGS. 6A and 6B, one end 1625*a* of the terminal member 1625 is led out to the end surface side opposed to the first capacitor circuit 161, and is formed so as to abut against the other end 1615*b* of the terminal member 1615 of the first capacitor circuit 161 and be thereby electrically connected to the other end 1615*b* of the terminal member 1615. As shown in FIGS. 6B and 6C, another end 1625*b* of the terminal member 1625 is led out so as to be exposed on the side of the opening of the hollow part 1621 on the end surface side opposed to the cap 17.

As shown in FIGS. 6B and 6C, the other end 1626*b* of the terminal member 1626 connected to all of the second electrodes 165 of the chip capacitors 163 housed in the hollow part 1621 is provided so as to be bent on the outside of the opening of the hollow part 1621 on the end surface side opposed to the end surface of the cap 17.

In addition, at a predetermined position of an outer circumferential part of the holder 1620 of the second capacitor circuit 162, a projection part 162*a* is formed along the direction of the central axis. The projection part 162*a* is used for the positioning of the second capacitor circuit 162 in the circumferential direction within the second cylindrical body 5B. In addition, a ring-shaped projection part 162*b* is formed on a circumferential surface of a part of the holder 1620 of the second capacitor circuit 162 which part is to be fitted into the cap 17.

Further, as shown in FIGS. 4 and 5C, fitting depression holes 1616 and 1617 are formed in the end surface of the holder 1610 of the first capacitor circuit 161 which end surface is opposed to the holder 1620 of the second capacitor circuit 162. In addition, as shown in FIGS. 6A and 6B, projection parts 1627 and 1628 to be fitted into the fitting depression holes 1616 and 1617 of the holder 1610 are formed on the end surface of the holder 1620 of the second capacitor circuit 162 which end surface is opposed to the holder 1610 of the first capacitor circuit 161.

In this case, as shown in FIG. 6D, the fitting depression holes 1616 and 1617 of the holder 1610 are bent in an L-shape, and ends of the projection parts 1627 and 1628 of the holder 1620 are bent in an L-shape. When the projection parts 1627 and 1628 of the holder 1620 are fitted into the fitting depression holes 1616 and 1617 of the holder 1610, the projection parts 1627 and 1628 of the holder 1620 are elastically displaced and inserted into the fitting depression holes 1616 and 1617, and the first capacitor circuit 161 and the second capacitor circuit 162 are coupled to each other by the bent parts of the projection parts 1627 and 1628 and the fitting depression holes 1616 and 1617 such that the first capacitor circuit 161 and the second capacitor circuit 162 are not easily uncoupled from each other.

Example of Constitution of Cap 17

Figure 7A:
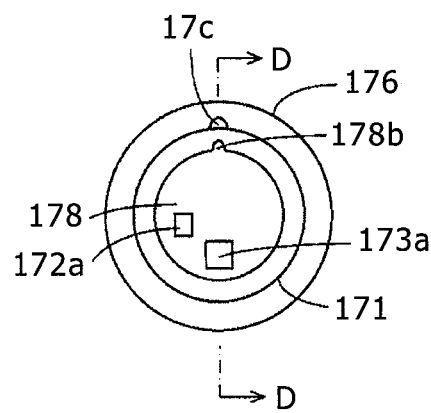
FIGS. 7A, 7B, and 7C are diagrams of assistance in explaining an example of constitution of a part of the first embodiment of the electronic ink cartridge according to the present invention.
Figure 7B:
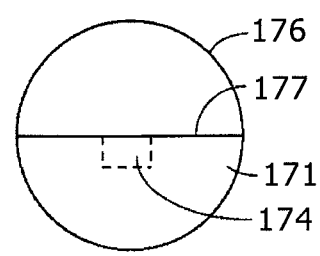
Figure 7C:
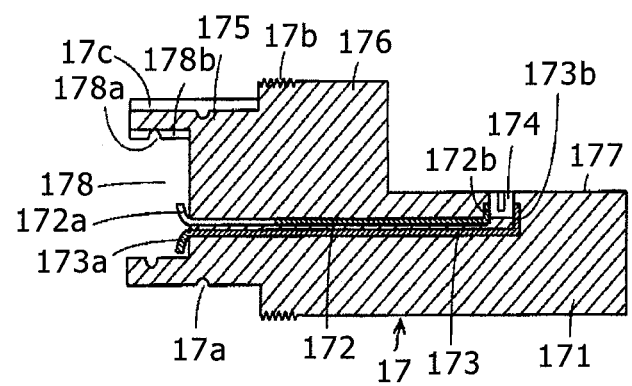

An example of constitution of the cap 17 will next be shown in FIGS. 7A to 7C. FIG. 7A is a diagram of the cap 17 as viewed from the side of the surface opposed to the capacitor circuit 16. FIG. 7B is a diagram of the cap 17 as viewed from an opposite side from the side of the surface opposed to the capacitor circuit 16. FIG. 7C is a cross-sectional view taken along a line D-D of FIG. 7A.

The cap 17 is provided by insert molding of terminal members 172 and 173 formed of a conductor in a main body 171 formed of a non-magnetic material, or a resin in the present example. In addition, the cap 17 has a connector 174 into which to fit an end of a flexible lead part 9 led out from the push switch 7 to be described later.

As shown in FIGS. 1A and 1B and FIG. 7C, the main body 171 of the cap 17 is in a cylindrical shape as a whole, and the main body 171 of the cap 17 includes a small-diameter part 175 having such a diameter as to be inserted into the second cylindrical body 5B of the electronic ink cartridge 10 on the side of the surface opposed to the capacitor circuit 16, and includes, as another part of the main body 171, a large-diameter part 176 having a larger diameter than the outside diameter of the cylindrical body 5. A part of the large-diameter part 176 of the cap 17 which part is on an opposite side from the side of the surface opposed to the capacitor circuit 16 has a shape formed by cutting away part of the cylindrical shape in the direction of the central axis. In the example of the figures, a half of the cylindrical shape of the large-diameter part 176 is cut away, and a flat surface 177 parallel with the direction of the central axis is formed.

The connector 174 is provided in the flat surface 177 formed on the large-diameter part 176. The terminal members 172 and 173 are provided so as to establish electric connection between the capacitor circuit 16 and the connector 174 provided in the flat surface 177 formed on the large-diameter part 176.

A ring-shaped groove part 17a for receiving the ring-shaped projection part 5Bb provided on the opening inner wall of the second cylindrical body 5B is formed in a circumferential part of the small-diameter part 175 of the cap 17. In addition, a projection part 17c to be engaged with the positioning cut-out 5Bc formed on the opening end side of the second cylindrical body 5B is formed on the small-diameter part 175 of the cap 17 in the direction of the central axis of the cap 17. Further, as will be described later, a threaded part 17b to be screwed into a threaded part formed in an inner wall surface of the casing of the position indicator 1 is formed in the large-diameter part 176 of the cap 17.

As shown in FIGS. 7A and 7C, a depression part 178 for receiving the second capacitor circuit 162 of the capacitor circuit 16 is formed in the small-diameter part 175 of the cap 17. The depression part 178 is a circular depression hole having a diameter substantially equal to the diameter of the second capacitor circuit 162. A ring-shaped depression groove 178a for receiving the ring-shaped projection part 162b of the second capacitor circuit 162 and a central-axis-direction depression groove 178b to engage with the central-axis-direction projection part 162a formed on the second capacitor circuit 162 are formed in a side wall of the depression part 178.

In addition, one end part 172a of the terminal member 172 and one end part 173a of the terminal member 173 are provided so as to be exposed at the bottom surface of the depression part 178 of the cap 17 to elastically abut against the other end 1625b of the terminal member 1625 and the other end 1626b of the terminal member 1626 on the end surface of the second capacitor circuit 162. Another end 172b of the terminal member 172 is connected to one terminal of the connector 174. Another end 173b of the terminal member 173 is connected to another terminal of the connector 174. Incidentally, the one terminal of the connector 174 is connected to one terminal of the push switch 7 to be described later, and the other terminal of the connector 174 is connected to another terminal of the push switch 7.

Equivalent Circuit

Figure 8:
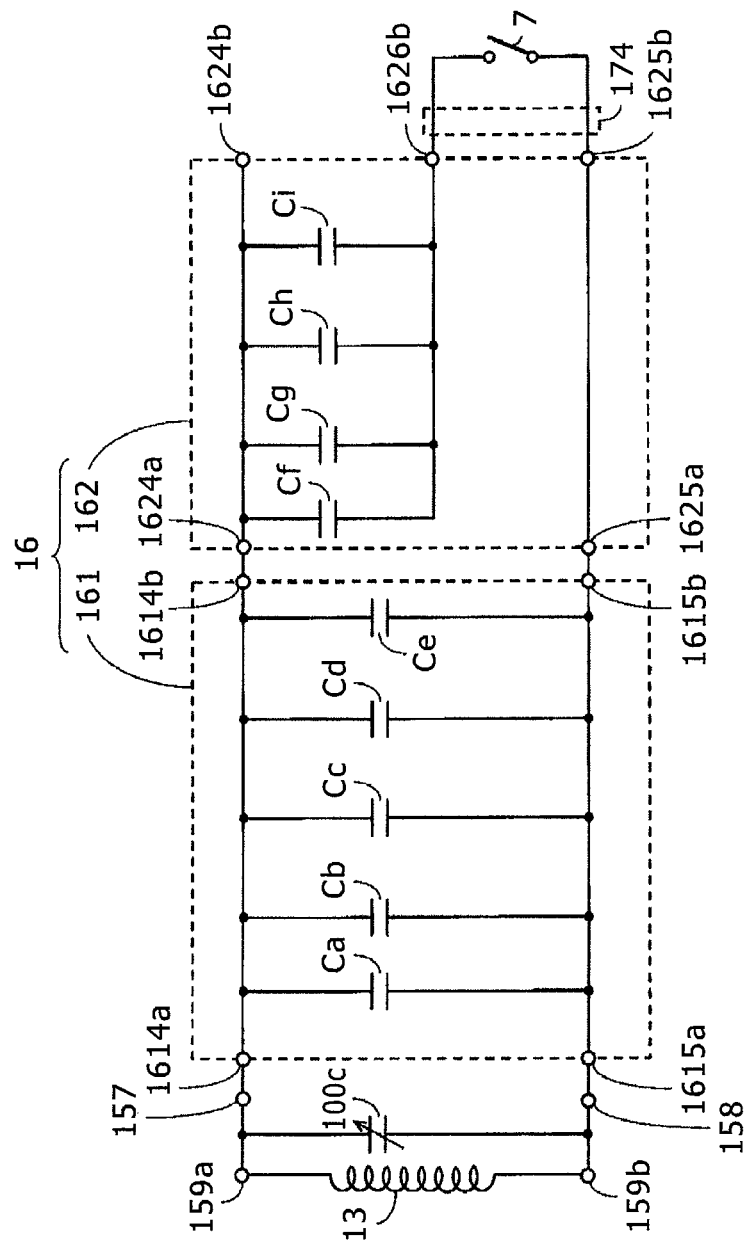
FIG. 8 is a diagram showing an equivalent circuit of the first embodiment of the electronic ink cartridge according to the present invention.

FIG. 8 shows an equivalent circuit of an electronic circuit part including the coil 13 of the electronic ink cartridge 10, a capacitor 100C forming the pressure sensitive chip 100, the capacitor circuit 16, and the push switch 7 described above. In this case, as described above, the one end 13a and the other end 13b of the coil 13 are connected to the terminal member 157 and the terminal member 158 via the terminal 159a and the terminal 159b provided on the upper surface 151a of the package member 151 of the pressure sensing semiconductor device 15. As described above, the capacitor 100C forming the pressure sensitive chip 100 in parallel with the coil 13 is connected between the terminal member 157 and the terminal member 158.

As described above, in a state in which the first capacitor circuit 161 of the capacitor circuit 16 is coupled to the pressure sensing semiconductor device 15, the one end 157a of the terminal member 157 in the depression part 156 of the pressure sensing semiconductor device 15 is connected to the one end 1614a of the terminal member 1614 of the first capacitor circuit 161 of the capacitor circuit 16. In addition, the terminal member 158 of the pressure sensing semiconductor device 15 is connected to the terminal member 1615 of the first capacitor circuit 161 by inserting the rod-shaped end 1615a of the terminal member 1615 into the insertion hole 158b of the terminal member 158.

As described above, the plurality of chip capacitors 163 forming the first capacitor circuit 161 are connected in parallel with each other between the terminal member 1614 and the terminal member 1615 of the first capacitor circuit 161. Hence, as shown in FIG. 8, the plurality of chip capacitors 163 forming the first capacitor circuit 161 are connected in parallel with the coil 13. FIG. 8 shows a state in which capacitances Ca to Ce of five chip capacitors 163 are connected in parallel with the inductance of the coil 13. Incidentally, the capacitances Ca to Ce of the plurality of chip capacitors 163 may be equal to each other, or may be different from each other. Because the capacitances Ca to Ce are connected in parallel with each other, the capacitance of the whole of the first capacitor circuit 161 is obtained by simply adding together the respective capacitances of the plurality of chip capacitors 163 forming the first capacitor circuit 161.

Next, in a state in which the second capacitor circuit 162 is further coupled to the first capacitor circuit 161, the other end 1614b of the terminal member 1614 of the first capacitor circuit 161 and the one end 1624a of the terminal member 1624 of the second capacitor circuit 162 are electrically connected to each other, and the other end 1615b of the terminal member 1615 of the first capacitor circuit 161 and the one end 1625a of the terminal member 1625 of the second capacitor circuit 162 are electrically connected to each other. As shown in FIG. 8, the push switch 7 is connected between the other end 1626b of the terminal member 1626 and the other end 1625b of the terminal member 1625 of the second capacitor circuit 162 via the connector 174 of the cap 17.

Hence, when the other end 1626b of the terminal member 1626 and the other end 1625b of the terminal member 1625 are short-circuited, a state equivalent to an on state of the push switch 7 is obtained. In this state, the plurality of chip capacitors 163 forming the second capacitor circuit 162 are connected in parallel with the coil 13 in addition to the plurality of chip capacitors 163 forming the first capacitor circuit 161. Incidentally, FIG. 8 shows a state in which capacitances Cf to Ci of four chip capacitors 163 forming the second capacitor circuit 162 are connected in parallel with the inductance of the coil 13. Also in this case, the capacitances Cf to Ci of the plurality of chip capacitors 163 may be equal to each other, or may be different from each other.

Assembly of Electronic Ink Cartridge 10 and Adjustment of Resonance Frequency

The electronic ink cartridge 10 is assembled as follows. In addition, adjustment is made to a desired resonance frequency by optimizing the value of capacitance of the capacitor circuit 16 so as to correspond to the inductance of the coil 13 and the capacitor 100C forming the pressure sensitive chip 100. In this case, the assembly of the electronic ink cartridge 10 and the adjustment of the resonance frequency can be performed automatically by using an automatic machine.

First, the coil spring 12 is inserted into the hollow part of the first cylindrical body 5A from the side of the opening 5Ab in the direction of the central axis with the side of the opening 5Aa as a front (distal) end. Next, the resonance circuit unit in which the ferrite core 14 to which the core body 11 is coupled and which is wound with the coil 13 is integrated with the pressure sensing semiconductor device 15 (see FIG. 3A) is inserted into the first cylindrical body 5A from the side of the opening 5Ab. Then, the ring-shaped depression grooves 15a and 15b formed in the package member 151 of the pressure sensing semiconductor device 15 are engaged with the ring-shaped projection parts 5Ad and 5Ae on the inner wall surface of the first cylindrical body 5A. Thereby the resonance circuit unit including the core body 11, the ferrite core 14 wound with the coil 13, and the pressure sensing semiconductor device 15 is locked so as not to move in the direction of the central axis within the first cylindrical body 5A.

At this time, the front end side of the core body 11 is extended out from the opening 5Aa of the first cylindrical body 5A in a state in which the coil spring 12 is inserted between the flange part 11a of the core body 11 and the stepped part of the first cylindrical body 5A which stepped part is formed on the side of the opening 5Aa. The coil spring 12 always biases the unit including the core body 11, the ferrite core 14 wound with the coil 13, and the pressure sensing semiconductor device 15 to the opposite side from the opening 5Aa, thus preventing the rattling of the unitized part within the first cylindrical body 5A.

In this state, the end surface of the pressure sensing semiconductor device 15 on the side where the pressure sensing semiconductor device 15 is to be connected to the capacitor circuit 16 is exposed at the opening 5Ab of the first cylindrical body 5A. Hence, the end part 157a of the terminal member 157 which end part is formed in the depression part 156 of the end surface of the pressure sensing semiconductor device 15 and the insertion hole 158b defined through the end part 158a of the terminal member 158, which end part is provided in the depression hole 156b of the depression part 156, can be contacted from the outside (see FIG. 3A).

In the present embodiment, using the terminal member 157 and the terminal member 158 that can be thus contacted from the outside, the capacitance of the first capacitor circuit 161 of the capacitor circuit 16 and the capacitance of the second capacitor circuit 162 of the capacitor circuit 16 are determined as follows, and the capacitor circuit 16 having the capacitances is disposed. Incidentally, as described above, the second capacitor circuit 162 is disposed so as to correspond to the disposition of the push switch 7 in the position indicator 1. When the push switch 7 is not disposed in the position indicator 1, the second capacitor circuit 162 having substantially no capacitance is disposed, or the capacitor circuit 16 is formed by the first capacitor circuit 161.

The setting of the capacitances of the capacitor circuit 16 will be described with reference to the equivalent circuit of FIG. 8. As described above, a parallel circuit of the coil 13 wound around the ferrite core 14 and the variable capacitor 100C forming the pressure sensitive chip 100 housed in the pressure sensing semiconductor device 15 is connected between the terminal member 157 and the terminal member 158 connected with the terminal 159a and the terminal 159b of the pressure sensing semiconductor device 15. Suppose that no pen pressure is applied to the core body 11 at this time, and that an inductance Lc of the coil 13 and a capacitance CVo of the capacitor 100C forming the pressure sensitive chip 100 at the time are each a value including variations caused by manufacturing.

First, a resonance frequency $f_1$ of the resonance circuit formed by the inductance Lc of the coil 13 and the capacitance CVo of the capacitor 100C forming the pressure sensitive chip 100 is measured using the terminal member 157 and the terminal member 158. Next, a resonance frequency $f_2$ is similarly measured with a capacitor having a known capacitance value Co connected to the terminal member 157 and the terminal member 158. Incidentally, suppose that a resonance frequency $f_0$ desired to be set is known, and that a capacitance value to be set in the first capacitor circuit 161 of the capacitor circuit 16 is Cx.

$$f_1^2 = 1/\{4 \cdot \pi^2 \cdot Lc \cdot CVo\}$$

$$f_2^2 = 1/\{4 \cdot \pi^2 \cdot Lc \cdot (CVo + Co)\}$$

$$f_0^2 = 1/\{4 \cdot \pi^2 \cdot Lc \cdot (CVo + Cx)\}$$

From these equations, $$Cx = Co(f_2/f_0)^2 \cdot (f_1^2 - f_0^2)/(f_1^2 - f_2^2)$$

As described above, even when the inductance Lc of the coil 13 and the capacitance of the capacitor 100C forming the pressure sensitive chip 100 are unknown or values including variations, the value of the capacitance further connected in parallel with the parallel circuit of the coil 13 and the capacitor 100C can be calculated so as to correspond to the resonance frequency desired to be set. In other words, the capacitance (capacitance of the first capacitor circuit 161 of the capacitor circuit 16) for making the resonance frequency of the resonance circuit of the position indicator 1 when the push switch 7 is off the target frequency $f_0$ can be calculated, and the capacitance of the first capacitor circuit 161 is set by forming the first capacitor circuit 161 of the capacitor circuit 16 with the number of chip capacitors 163 that provide the calculated capacitance.

In addition, similarly, a capacitance (capacitance Cx2 of the second capacitor circuit 162 of the capacitor circuit 16) for making the resonance frequency of the resonance circuit of the position indicator 1 when the push switch 7 is on a target frequency $f_4$, wherein the resonance circuit includes the coil 13, the pressure sensitive chip 100, and the first capacitor circuit 161, is calculated as follows.

Supposing that the capacitance value set in the first capacitor circuit 161 is Cx1 (this value is the same value as or an approximate value approximating to Cx), a resonance frequency $f_3$ is similarly measured with the capacitor circuit 16 having the capacitance value set to Cx1 connected to the terminal member 157 and the terminal member 158 in place of the capacitor having the known capacitance value Co.

$$f_1^2 = 1/\{4 \cdot \pi^2 \cdot Lc \cdot CVo\}$$

$$f_3^2 = 1/\{4 \cdot \pi^2 \cdot Lc \cdot (CVo + Cx1)\}$$

$$f_4^2 = 1/\{4 \cdot \pi^2 \pi Lc\pi(CVo + Cx1 + Cx2)\}$$

From these equations, $$Cx2 = Cx1 \cdot (f_1/f_4)^2 \cdot (f_3^2 - f_4^2)/(f_1^2 - f_3^2)$$

Then, the capacitance value Cx2 of the second capacitor circuit 162 of the capacitor circuit 16 is set to be the calculated capacitance Cx2.

As described above, the value of the capacitance of the first capacitor circuit 161 forming the capacitor circuit 16 can be calculated by measuring the resonance frequency of the resonance circuit unit including the core body 11, the ferrite core 14 wound with the coil 13, and the pressure sensing semiconductor device 15, which resonance circuit unit is disposed in the same state as an actual state of use. In actuality, the same value as or a value close to the calculated capacitance value is set as the value of the capacitance of the first capacitor circuit 161.

In addition, because the resonance frequency to which a change is made by operating the push switch (side switch) 7 is known, the value of the capacitance of the second capacitor circuit 162, which value is dependent on the value of the capacitance of the first capacitor circuit 161 of the capacitor circuit 16, can also be calculated.

Incidentally, the second capacitor circuit 162 is a capacitor circuit necessary when the push switch 7 is disposed in the position indicator 1. The second capacitor circuit 162 is coupled to the first capacitor circuit 161 by inserting and fitting the projection parts 1627 and 1628 of the second capacitor circuit 162 into the fitting depression holes 1616 and 1617 of the first capacitor circuit 161.

Then, the capacitor circuit 16 having the capacitance values set as described above is inserted into the depression part 156 of the pressure sensing semiconductor device 15 which depression part 156 is exposed on the side of the opening 5Ab of the first cylindrical body 5A, and the first capacitor circuit 161 is coupled to the pressure sensing semiconductor device 15 as described above.

Then, an integral cylindrical body is formed by screwing the threaded part 5Ba formed in the inner wall surface of the opening on one end side of the second cylindrical body 5B onto the threaded part 5Ac formed in the outer circumferential side surface of the opening 5Ab of the first cylindrical body 5A so as to house the first capacitor circuit 161 and the second capacitor circuit 162.

As is clear from the equivalent circuit of FIG. 8, the capacitances Cf to Ci of the second capacitor circuit 162 of the capacitor circuit 16 are isolated in a state in which the push switch 7 is off or in a state in which the push switch 7 is not connected, that is, when the end part 1625b and the end part 1626b are not connected to each other. Accordingly, with the exposed end parts 1625b and 1626b disconnected from each other, whether the resonance frequency of the resonance circuit including the coil 13, the capacitor 100C forming the pressure sensitive chip 100, and the capacitance of the first capacitor circuit 161 of the capacitor circuit 16 is a target frequency is checked using a measuring device. When a result of the check indicates that the resonance frequency of the resonance circuit is not the target resonance frequency, the capacitance value of the first capacitor circuit 161 of the capacitor circuit 16 is set again.

Next, with the exposed end parts 1625b and 1626b are electrically connected from each other to produce a state similar to the state in which the push switch 7 is on, whether the resonance frequency of the resonance circuit including the coil 13, the capacitor 100C forming the pressure sensitive chip 100, the capacitance of the first capacitor circuit 161 of the capacitor circuit 16, and the capacitance of the second capacitor circuit 162 of the capacitor circuit 16 is a target frequency is checked using a measuring device. When a result of the check indicates that the resonance frequency of the resonance circuit is not the target resonance frequency, the capacitance value of the second capacitor circuit 162 of the capacitor circuit 16 is set again.

After the work of checking of the resonance frequencies as described above is completed, the small-diameter part 175 of the cap 17 is inserted into the second cylindrical body 5B such that the projection part 17c is engaged with the positioning cut-out 5Bc and such that the projection part 162a of the second capacitor circuit 162 is engaged with the depression groove 178b of the depression part 178 of the cap 17. Then, the ring-shaped projection part 5Bb of the second cylindrical body 5B is fitted into the ring-shaped groove part 17a of the cap 17, and thus the cap 17 is locked to the inside of the second cylindrical body 5B. At this time, the other end 1625b of the terminal member 1625 and the other end 1626b of the terminal member 1626 of the second capacitor circuit 162 are connected respectively to the one end 172a of the terminal member 172 and the one end 173a of the terminal member 173 of the cap 17.

The electronic ink cartridge 10 is assembled as described above. The resonance frequency of the parallel resonance circuit including the coil 13, the capacitance of the pressure sensitive chip 100, and the capacitor circuit 16 that are incorporated in the electronic ink cartridge 10 are already adjusted in each of the states in which the push switch 7 is off and on. Hence, in the present embodiment, the adjustment of the resonance frequency is no longer necessary when the electronic ink cartridge 10 is housed in the casing 2 of the position indicator 1.

In the first embodiment, the part unitized as the resonance circuit unit, in which the core body 11, the ferrite core 14 wound with the coil 13, and the pressure sensing semiconductor device 15 are coupled to each other to form an integrated structure, is housed within the hollow part of the first cylindrical body 5A, and the end part 157a of the terminal member 157 and the end part 158a of the terminal member 158 which end parts are terminals for connection to the capacitor circuit 16 and are connected to the one end and the other end of the coil 13 are formed in the proximal end surface of the pressure sensing semiconductor device 15, in a state of being able to be contacted from the outside.

Therefore, the resonance frequency of the resonance circuit formed by the coil 13 in the state of being housed within the first cylindrical body 5A and the capacitance of the pressure sensitive chip 100 incorporated in the pressure sensing semiconductor device 15 can be measured using the terminals provided in the end surface. Thereby, the capacitance value of the capacitor circuit 16 forming the parallel resonance circuit together with the coil 13 can be calculated so that the resonance frequency becomes a desired value.

In the above-described embodiment, the terminals provided to the pressure sensing semiconductor device 15, which terminals are connected to the one end and the other end of the coil 13, are formed so as to be exposed through the first cylindrical body 5A. Thus, the position indicator can be formed by merely coupling the capacitor circuit 16 to the pressure sensing semiconductor device 15 such that one electrode and the other electrode of the capacitor circuit, 16 whose capacitance is adjusted, are connected to the terminals provided to the pressure sensing semiconductor device 15, which terminals are connected to the one end and the other end of the coil 13. Therefore the constitution is simplified greatly.

Further, in the present embodiment, all of the core body 11, the ferrite core 14 wound with the coil 13, the pressure sensing semiconductor device 15 as a pressure sensitive element, and the capacitor circuit 16 are formed as the electronic ink cartridge 10, and the electronic ink cartridge 10 is constructed in a state in which the resonance frequency is already adjusted. Hence, the position indicator can be formed by merely housing the electronic ink cartridge 10 within the casing of the position indicator. Therefore the position indicator in which the electronic ink cartridge 10 can be handled as in the case of a so-called refill for a ballpoint pen or the like can be realized.

In addition, as described above, in the present embodiment, all of the constituent parts within the cylindrical body 5 of the electronic ink cartridge 10 are arranged and disposed sequentially in the direction of the central axis of the cylindrical body 5, and electrically connected to each other and mechanically coupled to each other. There is thus another effect in that the constitution of a thin type electronic ink cartridge having a diameter of 2.5 mm, for example, as in the above-described example can be realized easily.

Incidentally, in the above description, the capacitor circuit 16 is used to adjust the resonance frequency of the resonance circuit of the position indicator having the push switch 7 and used in conjunction with a position detecting device of the electromagnetic induction system, as with the position indicator 1. Therefore, the push switch 7 is connected between the terminal member 162S and the terminal member 162G of the second capacitor circuit 162.

When the capacitor circuit 16 is applied to a position indicator not having the push switch 7 as a switch circuit and used in conjunction with a position detecting device of the electromagnetic induction system, a non-short-circuited state may be formed between the terminal member 162S and the terminal member 162G, so that the capacitances Cf to Ci are not used. However, a short-circuited state can also be formed between the terminal member 162S and the terminal member 162G, so that all of the capacitances Ca to Ci of the capacitor circuit 16 are selectively used as parallel capacitances forming the resonance circuit.

Housing of Electronic Ink Cartridge 10 in Casing 2 of Position Indicator 1

As shown in FIG. 2A, the electronic ink cartridge 10 according to the present embodiment is mounted to the first case member 3 of the casing 2 of the position indicator 1, and housed within the casing 2. The push switch 7 is provided in the first case member 3 of the casing 2, as described in the following, prior to the insertion of the electronic ink cartridge 10.

That is, a circular or oval through hole 3d, for example, is provided in a part of the circumferential side surface of the first case member 3. A depression operating element 8 for depressing the push switch 7 is disposed in the through hole 3d. The depression operating element 8 is formed of an elastic body such as an elastic rubber, for example.

Figure 2C:
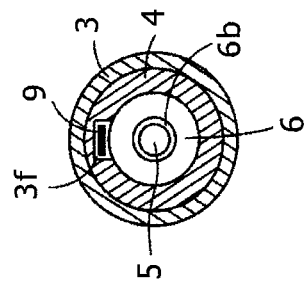
Figure 2B:
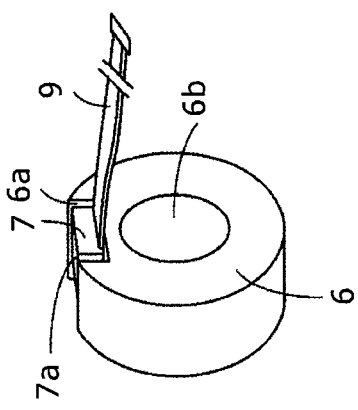

As shown in FIG. 2B, the push switch 7 is disposed within a part 6a of a ring-shaped member 6 whose outside diameter is substantially equal to the inside diameter of the first case member 3, the part 6a being formed by cutting away part in a circumferential direction of the ring-shaped member 6. The ring-shaped member 6 has a through hole 6b whose diameter is larger than the outside diameter of the cylindrical body 5 of the electronic ink cartridge 10. The ring-shaped member 6 is housed within the hollow part 3b of the first case member 3 such that a surface 7a to be depressed of the push switch 7 is at such a position as to be able to be depressed via the depression operating element 8.

In the present embodiment, a stepped part 3e is formed by making the diameter of the hollow part 3b of the first case member 3 on the side of the opening 3a slightly smaller than the other part. The position of the stepped part 3e is such that the surface 7a to be depressed of the push switch 7 housed within the hollow part 3b of the first case member 3 is at a position in the direction of the central axis which position corresponds to the depression operating element 8 as a result of the ring-shaped member 6 being positioned in the direction of the central axis by being engaged with the stepped part 3e.

Hence, the push switch 7 can be positioned by inserting the ring-shaped member 6, to which the push switch 7 is attached, to the position of the stepped part 3e within the first case member 3 and determining the position of the ring-shaped member 6 in a direction of rotation such that the surface 7a to be depressed of the push switch 7 corresponds to the depression operating element 8. After the positioning, the ring-shaped member 6 is fixed to the first case member 3 with an adhesive, for example.

In the present example, as shown in FIG. 2B, a lead part 9 formed by a flexible wiring board (which part will hereinafter be referred to as the flexible lead part) for electric connection of the push switch 7 is led out from the push switch 7. In a part of the circumferential part of the first case member 3, into which part to screw the cap 17 of the electronic ink cartridge 10, a guide groove 3f for producing an air space between the cap 17 and the first case member 3 is formed, as shown in FIG. 2C, which is a cross-sectional view taken in a line A-A of FIG. 2A. As shown in FIG. 2A and FIG. 2C, the flexible lead part 9 led out from the push switch 7 can be led out to the outside of the first case member 3 through the guide groove 3f.

As described above, in the present embodiment, the electronic ink cartridge 10 is inserted from the opposite side from the side of the core body 11 in the direction of the central axis of the first case member 3 of the casing 2, the casing 2 having the push switch 7 attached to the inside thereof. In this case, as shown in FIG. 2A, the electronic ink cartridge 10 is inserted in the direction of the central axis of the first case member 3 through the through hole 6b of the ring-shaped member 6 such that the core body 11 extended out from the cylindrical body 5 is extended out from the opening 3a of the first case member 3 of the casing 2 to the outside.

The opening 3a of the first case member 3 has a diameter larger than the diameter of the core body 11 but smaller than the diameter of the cylindrical body 5 of the electronic ink cartridge 10. The electronic ink cartridge 10 is therefore positioned in the direction of the central axis of the electronic ink cartridge 10 with the core body 11 side of the cylindrical body 5 of the electronic ink cartridge 10 engaged with an end part of the inner wall of the first case member 3 on the side of the opening 3a.

When the electronic ink cartridge 10 is inserted into the first case member 3, the flexible lead part 9 led out from the push switch 7 is led out to the side of the cap 17 of the electronic ink cartridge 10 through the guide groove 3f in advance. Then, the electronic ink cartridge 10 is fixed to the first case member 3 by screwing the threaded part 17b of the cap 17 of the electronic ink cartridge 10 into a threaded part 3c of the first case member 3.

An end of the flexible lead part 9 led out from the push switch 7 is thereafter fitted into the connector 174 formed in the cap 17 of the electronic ink cartridge 10 to establish an electric connection. The second case member 4 is thereafter press-fitted to the first case member 3, whereby the position indicator 1 according to the present embodiment is completed.

As described above, in the position indicator 1 according to the present embodiment, the electronic ink cartridge 10 can be detachably attached to the first case member 3, and as described above, the electronic ink cartridge 10 can be replaced easily. The push switch 7 can be connected after the electronic ink cartridge 10 is attached to the first case member 3, and there is another effect in that the push switch 7 is connected easily.

Circuit Configuration for Indicated Position Detection and Pen Pressure Detection In the position indicator 1 according to the present embodiment, when a pressing force (pen pressure) is applied to the core body 11, the capacitance of the pressure sensitive chip 100 in the pressure sensing semiconductor device 15 changes, and the resonance frequency changes according to the change in the capacitance. That is, the resonance frequency (phase) of an electromagnetic induction signal transmitted from the coil 13 of the resonance circuit changes. Hence, when the position indicator 1 in the present example is used, a position detecting device 300 having a circuit configuration shown in FIG. 9 can detect a position indicated by the position indicator 1 and the pen pressure in the position indicator 1.

Figure 9:
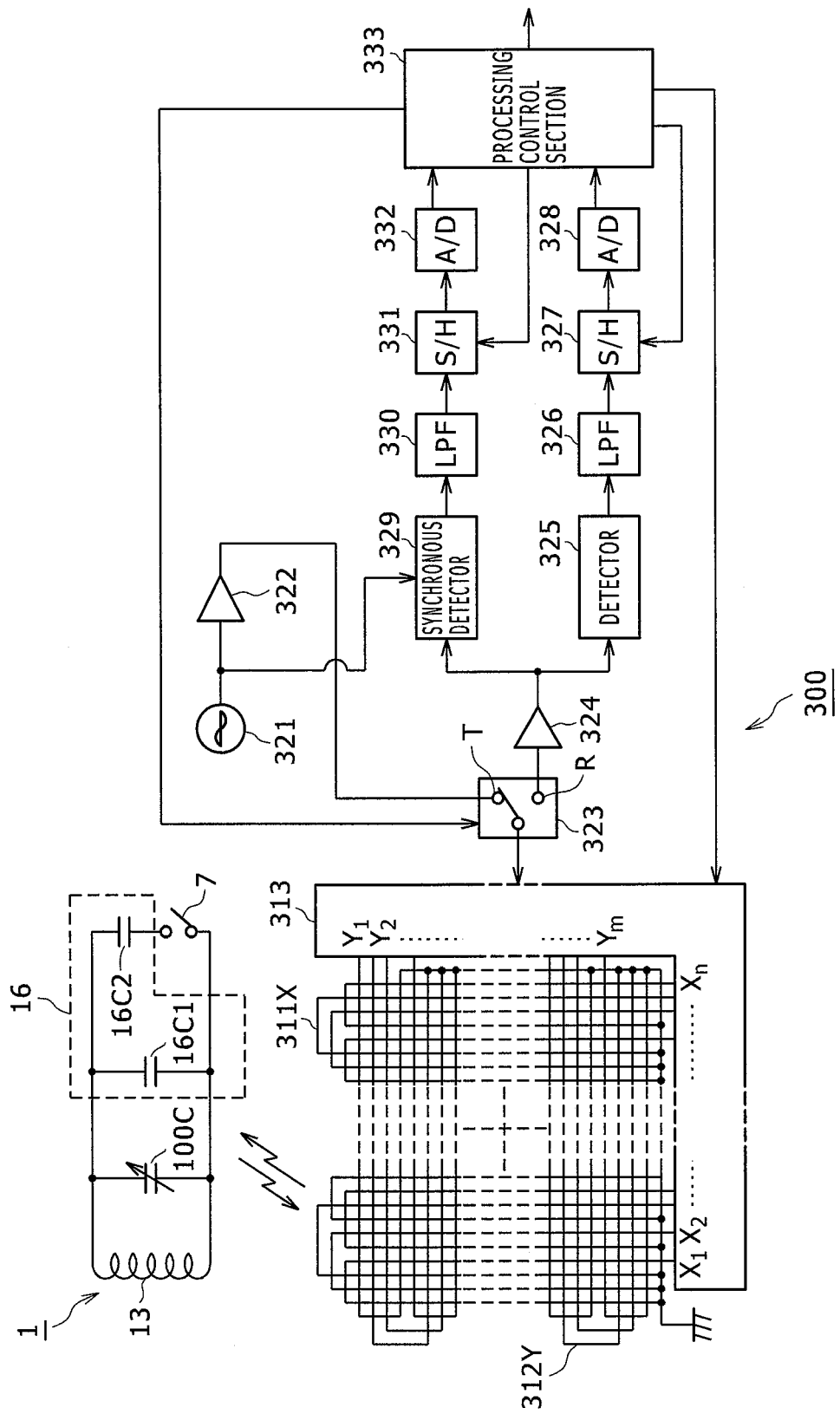
FIG. 9 is a diagram of assistance in explaining an equivalent circuit of the first embodiment of the position indicator according to the present invention in conjunction with a position detecting device.

Referring to FIG. 9, description will be made of an example of circuit configuration of the position detecting device 300 that detects an indicated position and detects pen pressure using the above-described position indicator 1. FIG. 9 is a block diagram showing an example of circuit configuration of the position indicator 1 and the position detecting device 300.

The position indicator 1 has the resonance circuit including the coil 13, the capacitor 100C forming the pressure sensitive chip 100, and the capacitor circuit 16. The resonance frequency of the resonance circuit is changed by selecting whether or not to connect a capacitance 16C2 of the second capacitor circuit 162 of the capacitor circuit 16 to a capacitance 16C1 of the first capacitor circuit 161 of the capacitor circuit 16 by the push switch 7.

That is, in the position indicator 1, as described above, the resonance frequency of the resonance circuit changes when the capacitance of the capacitor circuit 16 connected in parallel with the coil 13 is changed according to the turning on or off of the push switch 7. The position detecting device 300 detects pen pressure as described later and detects conditions of operation of the push switch 7 by detecting a frequency shift (phase) in the resonance frequency of the resonance circuit of the position indicator 1.

The position detecting device 300 has a position detecting coil formed by stacking an X-axis direction loop coil group 311X and a Y-axis direction loop coil group 312Y. The loop coil groups 311X and 312Y are for example formed by n rectangular loop coils and m rectangular loop coils, respectively. The loop coils forming the loop coil groups 311X and 312Y are disposed so as to be arranged at equal intervals and sequentially overlap each other.

The position detecting device 300 also includes a selecting circuit 313 connected with the X-axis direction loop coil group 311X and the Y-axis direction loop coil group 312Y. The selecting circuit 313 sequentially selects one loop coil of the two loop coil groups 311X and 312Y.

The position detecting device 300 further includes an oscillator 321, a current driver 322, a switching connecting circuit 323, a receiving amplifier 324, a detector 325, a low-pass filter 326, a sample and hold circuit 327, an A/D converter circuit 328, a synchronous detector 329, a low-pass filter 330, a sample and hold circuit 331, an A/D converter circuit 332, and a processing control section 333. The processing control section 333 is formed by a microcomputer, for example.

The oscillator 321 generates an alternating-current signal of a frequency f0. The alternating-current signal generated in the oscillator 321 is supplied to the current driver 322 and the synchronous detector 329. The current driver 322 converts the alternating-current signal supplied from the oscillator 321 into a current, and sends out the current to the switching connecting circuit 323. The switching connecting circuit 323 selects a connection destination (a transmitting side terminal T or a receiving side terminal R) to which the loop coil selected by the selecting circuit 313 is connected, under control of the processing control section 333. Of the connection destinations, the transmitting side terminal T is connected with the current driver 322, and the receiving side terminal R is connected with the receiving amplifier 324.

An induced voltage generated in the loop coil selected by the selecting circuit 313 is sent to the receiving amplifier 324 via the selecting circuit 313 and the switching connecting circuit 323. The receiving amplifier 324 amplifies the induced voltage supplied from the loop coil, and sends out the amplified induced voltage to the detector 325 and the synchronous detector 329.

The detector 325 detects the induced voltage generated in the loop coil, that is, a received signal, and sends out the received signal to the low-pass filter 326. The low-pass filter 326 has a cutoff frequency sufficiently lower than the above-mentioned frequency f0. The low-pass filter 326 converts the output signal of the detector 325 into a direct-current signal, and sends out the direct-current signal to the sample and hold circuit 327. The sample and hold circuit 327 holds a voltage value of the output signal of the low-pass filter 326 in predetermined timing, specifically predetermined timing during a receiving period, and sends out the voltage value to the A/D (Analog to Digital) converter circuit 328. The A/D converter circuit 328 converts the analog output of the sample and hold circuit 327 into a digital signal, and outputs the digital signal to the processing control section 333.

Meanwhile, the synchronous detector 329 performs synchronous detection of the output signal of the receiving amplifier 324 with the alternating-current signal from the oscillator 321, and sends out a signal having a level corresponding to a phase difference between the output signal and the alternating-current signal to the low-pass filter 330. The low-pass filter 330 has a cutoff frequency sufficiently lower than the frequency f0. The low-pass filter 330 converts the output signal of the synchronous detector 329 into a direct-current signal, and sends out the direct-current signal to the sample and hold circuit 331. The sample and hold circuit 331 holds a voltage value of the output signal of the low-pass filter 330 in predetermined timing, and sends out the voltage value to the A/D (Analog to Digital) converter circuit 332. The A/D converter circuit 332 converts the analog output of the sample and hold circuit 331 into a digital signal, and outputs the digital signal to the processing control section 333.

The processing control section 333 controls various parts of the position detecting device 300. Specifically, the processing control section 333 controls the selection of a loop coil in the selecting circuit 313, the switching of the switching connecting circuit 323, and the timing of the sample and hold circuits 327 and 331. The processing control section 333 causes an electromagnetic induction signal to be transmitted from the X-axis direction loop coil group 311X and the Y-axis direction loop coil group 312Y for a certain transmission duration on the basis of the input signals from the A/D converter circuits 328 and 332.

An electromagnetic induction signal transmitted from the position indicator 1 generates an induced voltage in each of loop coils of the X-axis direction loop coil group 311X and the Y-axis direction loop coil group 312Y. The processing control section 333 calculates the coordinate values of an indicated position in the X-axis direction and the Y-axis direction, which position is indicated by the position indicator 1, on the basis of the level of the voltage value of the induced voltage generated in each loop coil. In addition, the processing control section 333 detects whether the push switch 7 is depressed or not on the basis of the level of a signal corresponding to a phase difference between the transmitted electromagnetic induction signal and the received electromagnetic induction signal.

Thus, in the position detecting device 300, the processing control section 333 can detect the position of the position indicator 1 that has approached the position detecting device 300. In addition, the processing control section 333 in the position detecting device 300 can detect pen pressure applied to the core body of the position indicator 1, and can detect whether or not the push switch 7 is turned on in the position indicator 1, by detecting the phase (frequency shift) of the received signal.

As described above, the position detecting device 300 detects pen pressure and the on and off states of the push switch 7 by detecting a frequency shift (phase) in the resonance frequency of the resonance circuit of the position indicator 1.

Second Embodiment

FIGS. 10A and 10B are diagrams showing an example of constitution of an electronic ink cartridge 20 of a position indicator according to a second embodiment. FIG. 10A is a cross-sectional view of assistance in explaining an internal constitution of the electronic ink cartridge 20. Also in the present example, for the convenience of description, a part of constituent parts within a cylindrical body 50 of the electronic ink cartridge 20 are not shown in cross-section in FIG. 10A, but separate sectional views are prepared for the constituent parts, as will be described later. FIG. 10B is an exploded perspective view of assistance in explaining a constitution of the entire electronic ink cartridge 20.

Incidentally, the constitution of a casing of the position indicator according to the second embodiment and the structure of a push switch 7 attached to the casing are similar to those of the first embodiment, and therefore illustrations and description thereof will be omitted. In addition, in the description of the second embodiment, the same constituent elements as in the first embodiment are identified by the same reference numerals, and description thereof will be omitted.

The electronic ink cartridge 20 of the position indicator according to the second embodiment uses a pressure sensing semiconductor device 25, in which a pressure sensitive chip 100 similar to that of the first embodiment is housed in a package member 251 as an example of a pressure sensitive element. However, unlike the first embodiment, the pressure sensing semiconductor device 25 in the second embodiment is provided on the side of a core body 21, and is formed such that the pressure sensitive chip 100 receives a pressing force applied to the core body 21 directly from the core body 21.

As shown in FIGS. 10A and 10B, all of constituent parts of the position indicator of the electromagnetic induction system are housed in the cylindrical body 50 of the electronic ink cartridge 20. However, the cylindrical body 50 in the second embodiment is constructed as an integral element. The cylindrical body 50 in the second embodiment also has a thin shape, whose outside diameter is for example 2.5 mm and whose inside diameter is for example 1.5 mm to 2 mm. In addition, the cylindrical body 50 is formed by a non-magnetic material such as a non-magnetic metal, a resin material, glass, ceramic, or the like, or for example a material such as SUS305 or SUS310S in the present example.

An opening 50a, from which the distal end of the core body 21 extends, is provided on a distal end side in the direction of the central axis of the cylindrical body 50. The diameter of the opening 50a is smaller than the inside diameter of the cylindrical body 50. An opening 50b is formed over the entire inside diameter of a proximal end side in the direction of the central axis of the cylindrical body 50.

As shown in FIG. 10A and FIG. 10B, as viewed from the distal opening 50a, a coil spring 22, the core body 21, the pressure sensing semiconductor device 25, a ferrite core 24 as an example of a magnetic material wound with a coil 23, a coupling member 26, and a capacitor circuit 16 are sequentially arranged in this order and housed within the cylindrical body 50 such that the direction of the central axis of each of the parts is the direction of the central axis of the cylindrical body 50. A cap 17 is inserted into the proximal opening 50b of the cylindrical body 50 to close the proximal opening 50b of the cylindrical body 50.

Incidentally, in the second embodiment, at a point in time that the coil spring 22, the core body 21, the pressure sensing semiconductor device 25, the ferrite core 24 wound with the coil 23, and the coupling member 26 are housed in the cylindrical body 50, projection parts are formed on an inner circumferential surface of the cylindrical body 50 by squeezing (crimping), in the direction toward the central axis, circumferential surface positions 50c and 50d of the cylindrical body 50 that correspond to a circumferential surface of the coupling member 26. Thereby, the coupling member 26 is press-held by the cylindrical body 50, and the position of the coupling member 26 is regulated so that the coupling member 26 does not move in the direction of the central axis. A biasing force of the coil spring 22 disposed between the side of the opening 50a of the cylindrical body 50 and the pressure sensing semiconductor device 25 prevents the pressure sensing semiconductor device 25 and the ferrite core 24 wound with the coil 23 from rattling in the direction of the central axis.

In addition, a ring-shaped projection part 50e to be fitted into a ring-shaped groove part 17a formed in the periphery of a small-diameter part 17b of the cap 17 made of a non-magnetic material such as a resin, for example, is formed on an inner wall surface of the cylindrical body 50 in the vicinity of the proximal opening 50b by squeezing (crimping), toward the central axis, a circumferential part of the cylindrical body 50 at the position of the ring-shaped projection part 50e. Hence, when the cap 17 is inserted into the cylindrical body 50, the ring-shaped projection part 50e of the cylindrical body 50 is fitted into the ring-shaped groove part 17a formed in the outer circumferential surface of the small-diameter part 17b of the cap 17. The cap 17 is thereby press-fitted so that the cap 17 is not detached from the opening 50b of the cylindrical body 50. In addition, a cut-out 50f for positioning in a circumferential direction is formed along the direction of the central axis in a predetermined position in the circumferential direction of a circumferential surface on the side of the proximal opening 50b on the proximal end side of the cylindrical body 50. A projection part 17c in the direction of the central axis of the cap 17 is engaged with the cut-out 50f for positioning.

Further description will be made of the constitution of parts housed within the cylindrical body 50, the assembly of the electronic ink cartridge 20, and the adjustment of resonance frequency.

As shown in FIG. 10B, the core body 21 in the second embodiment is formed by a rod-shaped member made of a resin, for example. In the second embodiment, the rod-shaped core body 21 is inserted as a pressing member into the pressure sensing semiconductor device 25.

The ferrite core 24 in the second embodiment has a cylindrical shape of a fixed diameter, and is wound with the coil 23. A depression part 252 is provided on a proximal side, which is opposite from the side of an upper surface 251a of the package member 251 of the pressure sensing semiconductor device 25 that receives the core body 21 inserted therein. A distal side in the direction of the central axis of the ferrite core 24 is fitted into the depression part 252.

A proximal side in the direction of the central axis of the ferrite core 24 is fitted and coupled to the coupling member 26 formed of a resin, for example. A depression hole 24a, which receives a projection part 261 of the coupling member 26 to be described later, is formed in the center of a proximal end surface of the ferrite core 24 on the side of the coupling member 26.

While the pressure sensing semiconductor device 25 in the second embodiment can have a similar constitution to that of the pressure sensing semiconductor device 15 in the first embodiment, the pressure sensing semiconductor device 25 in the present example has a constitution as shown in FIGS. 11A and 11B.

The package of the pressure sensing semiconductor device 25 in the second embodiment is formed by only the package member 251 made of an elastic resin member, for example a silicon rubber, and does not have the elastic member 153 disposed independently in the pressure sensing semiconductor device 15.

A depression hole 253 having a predetermined cross-sectional shape, for example a circular cross-sectional shape, which corresponds to the communicating hole 154 of the pressure sensing semiconductor device 15 described above, is formed in the package member 251. As shown in FIG. 11B, an inner wall surface of the depression hole 253 is provided with projection parts 254a and 254b in the shape of an O-ring for retaining the core body 21 in the shape of a round rod. That is, the inside diameter of the depression hole 253 is equal to or slightly larger than the diameter of an abutting part of the core body 21 in the shape of a round rod, and the inside diameter of the projection parts 254a and 254b in the shape of an O-ring is selected to be smaller than the diameter of the abutting part of the core body 21.

Therefore, when the core body 21 is guided by a tapered part 251c provided on the side of an opening part (side of the upper surface 251a) of the package member 251, and inserted into the depression hole 253, the core body 21 is retained by the projection parts 254a and 254b. However, the core body 21 can be extracted from the depression hole 253 with a predetermined force. Therefore the core body 21 can be replaced easily. Incidentally, the core body 21 as a projection-shaped member in the second embodiment is also a pressing member for transmitting pressure to the package member 251 as a pressure transmitting member.

As shown in FIGS. 11A and 11B, a first electrode 101 of the pressure sensitive chip 100 is connected to a first lead terminal 256 formed of a conductor by a gold wire 255, and a second electrode 102 of the pressure sensitive chip 100 is connected to a second lead terminal 257 formed of a conductor, in a state of being in contact with the second lead terminal 257. In the second embodiment, end parts of the first and second lead terminals 256 and 257 are led out so as to be orthogonal to a bottom surface of the package member 251.

As will be described later, the first lead terminal 256 and the second lead terminal 257 of the pressure sensing semiconductor device 25 are electrically connected to terminal members 262 and 263 of the coupling member 26 by a gold wire, a lead wire, or the like. One end and another end of the position indicating coil 23 wound around the ferrite core 24 are also electrically connected to the terminal members 262 and 263 of the coupling member 26. The other constitution of the pressure sensing semiconductor device 25 is similar to that of the pressure sensing semiconductor device 15.

In the second embodiment, the pressure sensing semiconductor device 25 is disposed in a position close to the core body 21. Therefore pen pressure can be detected with high sensitivity. In addition, the pressure sensing semiconductor device 25 used in the second embodiment is formed such that the package member 251 functions as a pressure transmitting member. Therefore the constitution of the pressure sensing semiconductor device 25 can be simplified greatly.

Next, FIGS. 12A to 12C show an example of constitution of the coupling member 26. FIG. 12A is a diagram showing an end surface of the coupling member 26 as viewed from a side where the coupling member 26 is coupled to the ferrite core 24 in the direction of the central axis of the coupling member 26. FIG. 12B is a cross-sectional view taken along a line F-F of FIG. 12A. FIG. 12C is a diagram showing an end surface of the coupling member 26 as viewed from the side of the capacitor circuit 16 in the direction of the central axis of the coupling member 26.

The coupling member 26 is formed of a resin, for example, as described above, and includes a main body part 260 having a cylindrical shape whose outside diameter is substantially the same as or slightly smaller than the inside diameter of the cylindrical body 50. As shown in FIGS. 12A and 12B, a depression hole 264, into which a part of the cylindrical part of the ferrite core 24 is fitted, is provided in the distal end surface of the main body part 260 of the coupling member 26, on the side where the coupling member 26 is coupled to the ferrite core 24, and a projection part 261 to be fitted into the depression hole 24a formed in an end surface of the ferrite core 24 is formed in the center of a bottom surface of the depression hole 264.

In addition, as shown in FIGS. 12A and 12B, depression grooves 265 and 266 are formed in a direction along the direction of the central axis of the cylinder of the main body part 260 of the coupling member 26 at positions in a circumferential surface of the main body part 260 of the coupling member 26, which positions are separated from each other by an interval of an angle of 180 degrees in the present example. One end part 262a of the terminal member 262 and one end part 263a of the terminal member 263 extend upright in a direction orthogonal to the circumferential direction within the depression grooves 265 and 266. As shown in FIG. 12A, V-shaped notches 262c and 262d and V-shaped notches 263c and 263d are formed in the one end part 262a of the terminal member 262 and the one end part 263a of the terminal member 263, respectively.

The V-shaped notches 262c and 262d of the terminal member 262 are for connection of the first electrode 101 of the pressure sensitive chip 100 in the pressure sensing semiconductor device 25 and the one end of the coil 23. The V-shaped notches 263c and 263d of the terminal member 263 are for connection of the second electrode 102 of the pressure sensitive chip 100 in the pressure sensing semiconductor device 25 and the other end of the coil 23.

As shown in FIG. 12B, at a proximal end part of the terminal member 262 of the coupling member 26, a depression part 268 is provided for receiving a part of the capacitor circuit 16. As shown in FIGS. 12B and 12C, a ring-shaped electrode conductor 262b to abut against one end (ring-shaped electrode conductor) 1614a of a terminal member 1614 of a first capacitor circuit 161 of the capacitor circuit 16 is formed on a bottom surface of the depression part 268. A depression hole 267 is formed in the center of the bottom surface of the depression part 268 of the coupling member 26 in a state of being separated from the ring-shaped electrode conductor 262b. Further, a ring-shaped depression groove 268a for receiving a ring-shaped projection part 161a of the capacitor circuit 16 is formed in a side circumferential surface of the depression part 268.

Another end part 263b of the terminal member 263 of the coupling member 26 is formed so as to be located within the depression hole 267, and an insertion hole 263e defined through an elastic bent part is formed in (through) the end part 263b of the terminal member 263, which is located within the depression hole 267. One rod-shaped end 1615a of a terminal member 1615 of the first capacitor circuit 161 of the capacitor circuit 16 is inserted into the insertion hole 263e.

The coupling member 26 is bonded and coupled to the ferrite core 24 with an adhesive, for example, in a state in which the projection part 261 is fitted in the depression hole 24a in the end surface of the ferrite core 24. Lead wires are connected to the lead terminals 256 and 257 connected respectively to the first electrode 101 and the second electrode 102 of the pressure sensitive chip 100 in the pressure sensing semiconductor device 25. The lead wires are inserted respectively into, and thereby connected respectively to, the V-shaped notch 262c or 262d of the one end part 262a of the terminal member 262 of the coupling member 26 and the V-shaped notch 263c or 263d of the one end part 263a of the terminal member 263 of the coupling member 26. In addition, lead wires connected to one end 23a and another end 23b of the coil 23 are inserted respectively into, and thereby connected respectively to, the V-shaped notch 262c or 262d of the one end part 262a of the terminal member 262 of the coupling member 26 and the V-shaped notch 263c or 263d of the one end part 263a of the terminal member 263 of the coupling member 26.

Thus, in the second embodiment, the core body 21, the pressure sensing semiconductor device 25, the ferrite core 24 wound with the coil 23, and the coupling member 26 are coupled to each other, and can be handled as a resonance circuit unit.

In the second embodiment, with the side of the distal opening 50a as a front end, the coil spring 22 is inserted into the hollow part of the cylindrical body 50 from the opposite side of the proximal opening 50b. Next, the constituent part, in which the core body 21, the pressure sensing semiconductor device 25, the ferrite core 24 wound with the coil 23, and the coupling member 26 are coupled and integrated with each other, is inserted as a resonance circuit unit such that the one end side of the coil spring 22 abuts against the side of the upper surface 251a of the pressure sensing semiconductor device 25. The core body 21 may be inserted and fitted into the pressure sensing semiconductor device 25 in advance and housed in the cylindrical body 50, or may be inserted and fitted into the pressure sensing semiconductor device 25 later from the side of the distal opening 50a.

Incidentally, the lead wires connected respectively to the first electrode 101 and the second electrode 102 of the pressure sensitive chip 100 in the pressure sensing semiconductor device 25 and the one end 23a and the other end 23b of the coil 23 are inserted into and connected to the terminal members 262 and 263 within the depression grooves 265 and 266 of the coupling member 26. Thus, the lead parts connected to the first electrode 101 and the second electrode 102 of the pressure sensitive chip 100 and the one end and the other end of the coil 23 are not in contact with the inner wall surface of the cylindrical body 50.

In the second embodiment, after the parts up to the coupling member 26 are thus inserted into the cylindrical body 50, the cylindrical body 50 is squeezed by a predetermined jig at the above-described positions 50c and 50d in a state in which the side of the coupling member 26 is somewhat pressed against the biasing force of the coil spring 22, so that the coupling member 26 is locked so as not to move in the axial direction within the cylindrical body 50.

In this state, the coil spring 22 disposed on the side of the opening 50a within the hollow part of the cylindrical body 50 biases the pressure sensing semiconductor device 25 and the ferrite core 24 to the side of the coupling member 26 at all times, thus preventing the rattling of the members forming the position indicator.

At this time, at the bottom surface of the depression part 268 in the end surface of the coupling member 26 on the side of the capacitor circuit 16 within the cylindrical body 50, the ring-shaped electrode conductor 262b of the other end part of the terminal member 262 and the insertion hole 263e of the other end part 263b of the terminal member 263 are exposed within the cylindrical body 50. Therefore, in the second embodiment, a jig is used to expose the ring-shaped electrode conductor 262b of the other end of the terminal member 262 and the insertion hole 263e of the other end of the terminal member 263 of the coupling member 26 to the side of the proximal opening 50b of the cylindrical body 50. The jig has electrode terminals that are inserted into the cylindrical body 50 from the side of the proximal opening 50b, electrically connected to the ring-shaped electrode conductor 262b and the insertion hole 263e, respectively, and exposed to the side of the proximal opening 50b of the cylindrical body 50. The jig has a shape and a size similar to those of the capacitor circuit 16.

The setting of capacitance values of the capacitor circuit 16 in the electronic ink cartridge 20 is performed as in the case of the electronic ink cartridge 10 except for the use of the jig.

After the capacitance value of the first capacitor circuit 161 forming the capacitor circuit 16 and the capacitance value of the second capacitor circuit 162 forming the capacitor circuit 16 are calculated, the capacitor circuit 16 set to have the calculated capacitance values is inserted into the cylindrical body 50 to be fitted into the depression part 268 of the coupling member 26, and the ring-shaped projection part 161a of the capacitor circuit 16 is fitted into the ring-shaped depression groove 268a of the depression part 268 of the coupling member 26. The capacitor circuit 16 is thereby locked to the coupling member 26.

In the state of the coupling member 26 and the capacitor circuit 16 being coupled to each other, the one rod-shaped end 1615a of the terminal member 1615 of the first capacitor circuit 161 of the capacitor circuit 16 is inserted into the insertion hole 263e of the terminal member 263 of the coupling member 26, and is thereby electrically connected to the insertion hole 263e, and the distal end 1614a of the terminal member 1614 of the first capacitor circuit 161 of the capacitor circuit 16 abuts against the ring-shaped electrode conductor 262b of the coupling member 26, and is thereby electrically connected to the ring-shaped electrode conductor 262b. The coil 23 and the capacitor circuit 16 are thus electrically connected in parallel with each other.

Thereafter, as in the first embodiment, the small-diameter part 175 of the cap 17 is inserted from the side of the proximal opening 50b of the cylindrical body 50 in a state of the projection part 17c being engaged with the positioning cut-out 50f. The ring-shaped projection part 50e formed in the cylindrical body 50 is thereby fitted into the ring-shaped groove part 17a formed in the small-diameter part 175 of the cap 17. The cap 17 is thus mounted and locked to the inside of the cylindrical body 50. Also, at this time, as described in the first embodiment, an electric connection is made between a connector 174 formed in the cap 17 and the capacitor circuit 16.

The electronic ink cartridge 20 is assembled as described above. In the electronic ink cartridge 20, when a pressing force in the direction of the central axis is applied to the core body 21, the capacitance of the pressure sensitive chip 100 in the pressure sensing semiconductor device 25 changes. Then, as in the first embodiment, the resonance frequency (phase) of an electromagnetic induction signal transmitted from the coil 23 of the resonance circuit of the position indicator changes according to the change in the capacitance of the pressure sensitive chip 100. Thereby, the position detecting device having the circuit configuration shown in FIG. 9 can detect a position indicated by the position indicator according to the second embodiment and the pen pressure.

Then, in the case of the electronic ink cartridge 20, as in the case of the electronic ink cartridge 10 according to the first embodiment, an end of the flexible lead part 9 housed in the casing 2 of the position indicator 1 and led out from the push switch 7 is fitted into the connector 174 formed in the cap 17 of the electronic ink cartridge 20 to establish an electric connection. The second case member 4 is thereafter press-fitted to the first case member 3, whereby the position indicator according to the second embodiment is completed. The position indicator according to the second embodiment can provide similar action and effect to those of the foregoing first embodiment.

Third Embodiment

The position indicator according to the foregoing embodiments transmits and receives electromagnetic induction signals to and from the position detecting device using a parallel resonance circuit including a coil and a capacitor, and thereby enables the position detecting device to detect a position indicated by the indicator and pen pressure in the position indicator. However, when an information transmitting circuit is provided to the position indicator, identifying information (ID) of the position indicator and the electronic ink cartridge, for example, can be transmitted from the position indicator to the position detecting device as information related to the position indicator and the electronic ink cartridge.

The identifying information (ID) is for example information related to the electronic ink cartridge, and can include information for identifying a manufacturer, a product number, a manufacturing date, a manufacturing lot number, a position detecting system such as the electromagnetic induction system, the capacitance system, or the like, a pen pressure detecting system based on variable inductance or variable capacitance, and the like of the electronic ink cartridge or the position indicator. This identifying information is registered in a semiconductor element such as a memory, register, or the like provided to the information transmitting circuit.

The third embodiment represents a case of a position indicator 1A that transmits the identifying information of an electronic ink cartridge to a position detecting device.

The electronic ink cartridge 20A in the position indicator 1A according to the third embodiment has a similar constitution to that of the electronic ink cartridge 20 according to the second embodiment, and therefore illustration thereof will be omitted. However, in the third embodiment, a cap 17 has a connector 179 in addition to the connector 174, the connector 179 being connected with another end 1624b of a terminal member 1624 and another end 1625b of a terminal member 1625 which ends are exposed to an end surface of a second capacitor circuit 162. The information transmitting circuit is connected to the electronic ink cartridge 20A via the connector 179.

Figure 13:
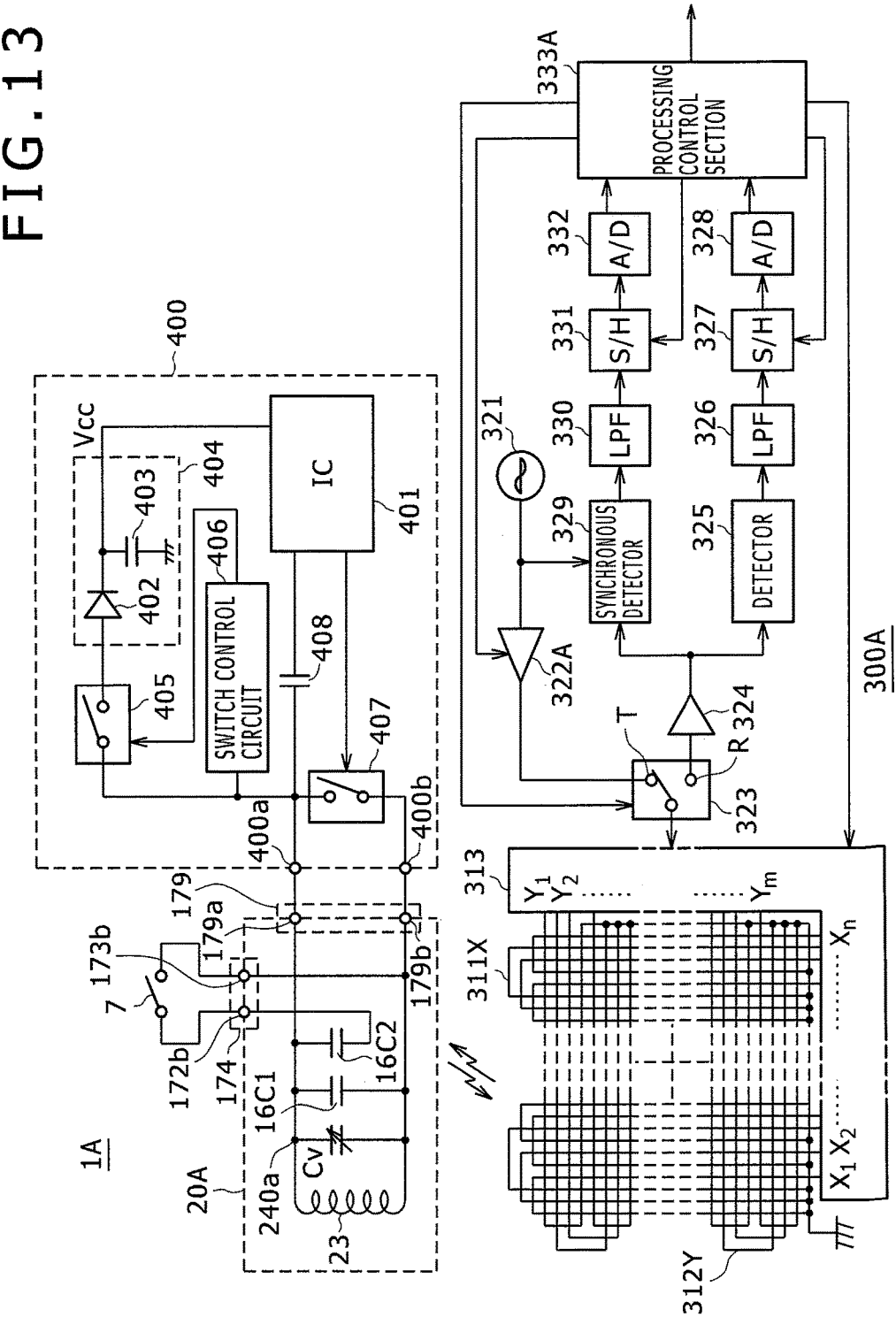
FIG. 13 is a diagram of assistance in explaining an equivalent circuit of a third embodiment of the position indicator according to the present invention in conjunction with a position detecting device.

FIG. 13 is a diagram showing circuit configuration of the position indicator 1A according to the third embodiment, which is configured to transmit the identifying information (ID) of the position indicator or the electronic ink cartridge to the position detecting device and the position detecting device 300A. The information transmitting circuit in the present example is an ID transmitting circuit.

The electronic ink cartridge 20A in FIG. 13 has a parallel resonance circuit in which a coil 23, a capacitor Cv forming a pressure sensitive chip 100 and changing in capacitance according to pen pressure, a capacitance 16C1 of a first capacitor circuit of a capacitor circuit 16, and a series circuit of a capacitance 16C2 of the second capacitor circuit 162 of the capacitor circuit 16 and a push switch 7 are connected in parallel with each other. The push switch 7 is connected to the connector 174 of the cap 17 of the electronic ink cartridge 20A.

As shown in FIG. 13, one terminal 179a of the connector 179 of the cap 17 of the electronic ink cartridge 20A is connected to one end of the coil 23, and another terminal 179b of the connector 179 is connected to another end of the coil 23. The one terminal 179a and the other terminal 179b of the connector 179 are connected respectively to terminals 400a and 400b of the ID transmitting circuit 400 as an example of the information transmitting circuit.

As shown in FIG. 13, the ID transmitting circuit 400 of the position indicator 1A has an IC (Integrated Circuit) 401 as an ID generation control circuit. The IC 401 is configured to operate on power Vcc obtained by rectifying an alternating-current signal received in the electronic ink cartridge 20A by electromagnetic coupling from the position detecting device 300A in a rectifying circuit (power supply circuit) 404 including a diode 402 and a capacitor 403. In the present example, a switch circuit 405 that is normally in an opened state (normally open) is provided between the connector 179 and the power supply circuit 404. This switch circuit 405 is formed by a semiconductor switch circuit, for example, and has a high-impedance state in the open state.

The switch circuit 405 is controlled to be turned on by a switch control signal from a switch control circuit 406. The switch control circuit 406 generates the switch control signal from the alternating-current signal received in the electronic ink cartridge 20A by electromagnetic coupling from the position detecting device 300A.

The ID transmitting circuit 400 also includes a switch circuit 407 connected in parallel with the coil 23. The switch circuit 407 is configured to be subjected to on-off control by the IC 401.

The IC 401 in the present example stores a manufacturer number and a product number of the position indicator 1A or the electronic ink cartridge 20A. The IC 401 transmits an ID signal including the manufacturer number and the product number as an eight-bit digital signal, for example, to the position detecting device 300A via the coil 23 by performing the on-off control of the switch circuit 407.

The position detecting device 300A in the present example of FIG. 13 is configured by providing the configuration of the position detecting device 300 shown in FIG. 9 with a current driver 322A capable of being variably adjusted in gain by an external gain control signal in place of the current driver 322 whose gain is fixed, and by providing a processing control section 333A in place of the processing control section 333. The other parts are similar to those of the position detecting device 300 shown in FIG. 9.

The current driver 322A is configured to be able to receive the gain control signal from the processing control section 333A and change the signal level of a transmission signal.

The processing control section 333A is formed by a microcomputer, for example. As with the above-described processing control section 333, in addition to the detection of a position indicated by the position indicator 1A and the detection of pen pressure applied to the position indicator 1A by transmitting and receiving electromagnetic induction signals to and from the position indicator 1A, the processing control section 333A supplies the current driver 322A with a signal for controlling the interruption of the transmission signal and a signal for controlling the level of the transmission signal, and performs reception processing for the ID signal from the position indicator 1A. As will be described later, the processing control section 333A detects an interrupted signal from the position indicator 1A as a digital signal of a few bits, for example eight bits, and thus detects the ID signal.

Description will be made in the following of the transmission and reception of the ID signal between the position indicator 1A and the position detecting device 300A and a position detecting operation and a pen pressure detecting operation in the position detecting device 300A.

Figure 14:
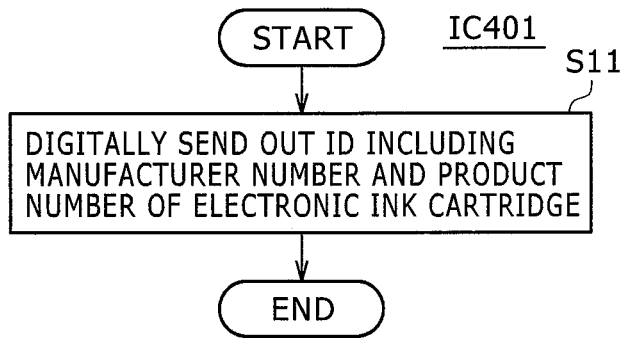
FIG. 14 is a flowchart of assistance in explaining process operation of principal parts of the position indicator according to the third embodiment of the present invention.

FIG. 14 is a flowchart of assistance in explaining process operation of the IC 401 of the position indicator 1A. The process is started when the switch circuit 405 is turned on and a power supply voltage Vcc is supplied from the power supply circuit 404 to the IC 401, as will be described later.

In a state in which the switch circuit 405 is off and thus the power supply voltage Vcc is not supplied from the power supply circuit 404, the operation of the IC 401 is stopped. At this time, as viewed from the connector 179, the ID transmitting circuit 400 is in a high-impedance state, which is equivalent to a state in which nothing is connected to the connector 179. Hence, at this time, no capacitance component is connected in parallel with the electronic ink cartridge 20A, and the resonance frequency of the electronic ink cartridge 20A is not affected by the ID transmitting circuit 400. Incidentally, the IC 401 is supplied with an electromagnetic induction signal transmitted from the position detecting device 300A via a capacitor 408 as a synchronizing signal for the transmission and reception of electromagnetic induction signals to and from the position detecting device 300A.

Figure 15:
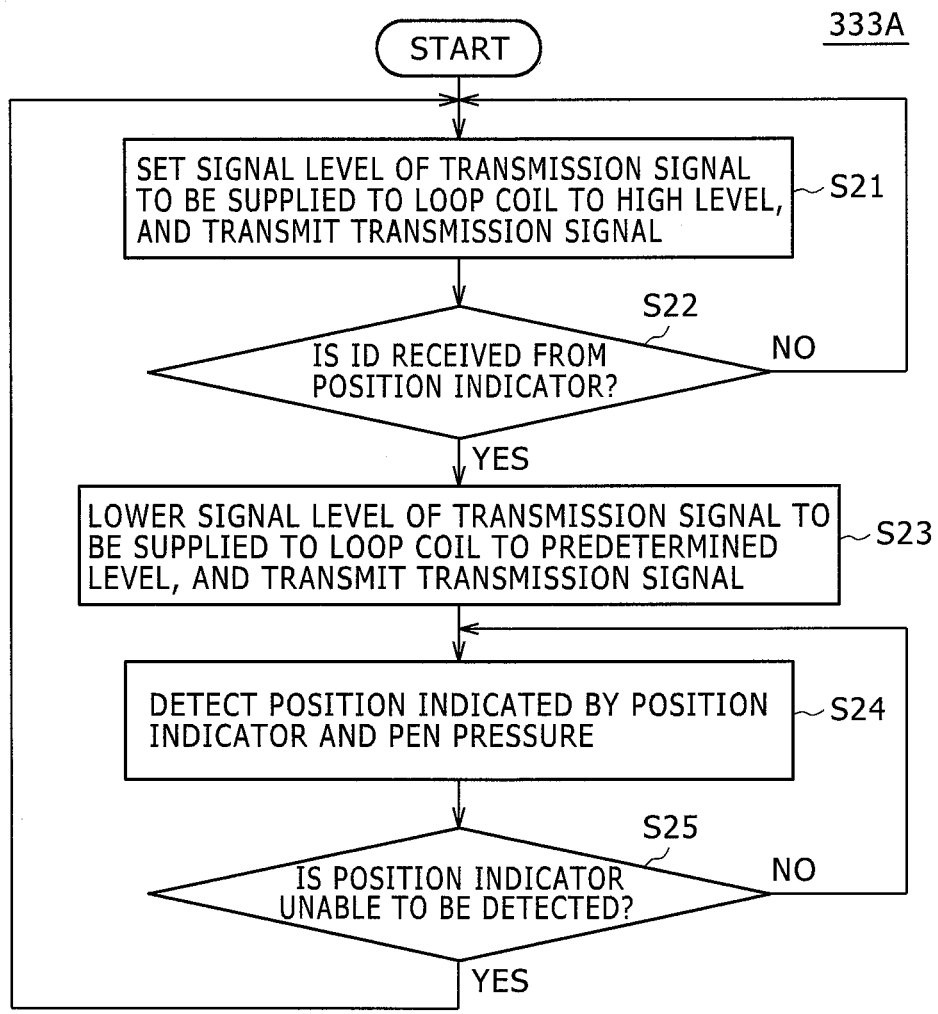
FIG. 15 is a flowchart of assistance in explaining process operation of principal parts of the position detecting device used in conjunction with the position indicator according to the third embodiment of the present invention.

FIG. 15 is a flowchart of assistance in explaining process operation of the processing control section 333A of the position detecting device 300A. This process is performed when power to the position detecting device 300A is turned on.

The processing control section 333A first supplies the current driver 322A with a gain control signal for setting the signal level of the transmission signal to a high level. An alternating-current signal of a frequency f0 from an oscillator 321 is thereby set to the high level by the current driver 322A, and supplied to loop coil groups 311X and 312Y via a selecting circuit 313 (step S21 in FIG. 15).

The electronic ink cartridge 20A in the position indicator 1A receives an electromagnetic induction signal produced by the alternating-current signal at the high level from the position detecting device 300A. At this time, the switch control circuit 406 generates a switch control signal for turning on the switch circuit 405 from the alternating-current signal received by the electronic ink cartridge 20A, so as to correspond to the high signal level of the alternating-current signal from the position detecting device 300A. Thereby, when the switch circuit 405 is turned on, the power supply voltage Vcc generated by rectifying the alternating-current signal received by the electronic ink cartridge 20A is supplied from the power supply circuit 404 to the IC 401.

When the power supply voltage Vcc is supplied to the IC 401, the IC 401 starts operation. The IC 401 generates the ID signal including the manufacturer number and the product number of the electronic ink cartridge 20A as a digital signal. An electromagnetic induction signal produced by the on-off control of the switch circuit 407 according to the digital signal is transmitted from the position indicator 1A to the position detecting device 300A (step S11 in FIG. 14).

Specifically, when the switch circuit 407 is off, the electronic ink cartridge 20A can return an electromagnetic induction signal to the position detecting device 300A by performing resonating operation in response to the alternating-current signal transmitted from the position detecting device 300A. The loop coils of the position detecting device 300A receive the electromagnetic induction signal from the electronic ink cartridge 20A of the position indicator 1A. When the switch circuit 407 is on, on the other hand, the electronic ink cartridge 20A is prohibited from performing resonating operation in response to the alternating-current signal transmitted from the position detecting device 300A. Therefore, no electromagnetic induction signal is returned from the electronic ink cartridge 20A to the position detecting device 300A. The loop coils of the position detecting device 300A thus detect the ID signal on the basis of whether or not the electromagnetic induction signal is received from the position indicator 1A.

In the present example, the processing control section 333A of the position detecting device 300A receives an eight-bit digital signal by detecting the presence or absence of the received signal from the position indicator 1A eight times. That is, the processing control section 333A in step S21 controls the gain of the current driver 322A to form a state in which the signal level of the transmission signal is set high and the transmission signal is sent out, and continuously performs transmission and reception eight times in similar timing to that in coordinate detection to detect the eight-bit ID signal from the position indicator 1A.

Meanwhile, the IC 401 of the position indicator 1A generates the eight-bit digital signal corresponding to the ID signal to be transmitted, and performs on-off control of the switch circuit 407 according to the eight-bit digital signal in synchronism with the transmission and reception of electromagnetic induction signals to and from the position detecting device 300A. For example, when a bit of the ID signal is "1," the switch circuit 407 is turned on. Then, as described above, no electromagnetic induction signal is returned from the position indicator 1A to the position detecting device 300A. On the other hand, when a bit of the ID signal is "0," the switch circuit 407 is turned off. Then, as described above, an electromagnetic induction signal is returned from the position indicator 1A to the position detecting device 300A.

Therefore, the processing control section 333A of the position detecting device 300A can receive the ID signal as the eight-bit digital signal by detecting the presence or absence of the received signal from the position indicator 1A eight times.

The processing control section 333A of the position detecting device 300A determines whether the ID signal from the position indicator 1A is received by performing the above-described process (step S22). When the processing control section 333A determines that the ID signal cannot be received within a predetermined time, the processing control section 333A returns to step S21 to transmit the transmission signal at the high level a predetermined number of times continuously. Incidentally, when the ID signal cannot be received even after the ID signal receiving process has been performed a predetermined number of times continuously, the processing control section 333A determines that the position indicator 1A does not have the function of sending out the ID signal, and skips the ID signal receiving process.

When the processing control section 333A determines in step S22 that the ID signal is received, the processing control section 333A decreases the gain of the current driver 322A to lower the signal level of the transmission signal to a predetermined level (normal use level) lower than the high level in step S21 (step S23). The predetermined level at this time is such that the detection of a position indicated by the position indicator 1A and the detection of pen pressure can be performed between the electronic ink cartridge 20A of the position indicator 1A and the position detecting device 300A, but the switch control circuit 406 of the position indicator 1A cannot turn on the switch circuit 405.

When the signal level of the electromagnetic induction signal transmitted from the position detecting device 300A is thus lowered to the predetermined level (normal use state), the switch control circuit 406 of the position indicator 1A does not output the switch control signal for turning on the switch circuit 405. Therefore, the supply of the power supply voltage Vcc from the power supply circuit 404 to the IC 401 is stopped, and the IC 401 is unable to operate. Thus, the process of the flowchart of FIG. 14 is ended, and the position indicator 1A does not transmit the ID signal.

The state in which the signal level of the electromagnetic induction signal transmitted from the position detecting device 300A is set at the predetermined level (normal use state) is an operating state similar to that in the case of FIG. 9. Thus, the processing control section 333A of the position detecting device 300A detects a position indicated by the position indicator 1A and pen pressure as described in the foregoing first embodiment by transmitting and receiving electromagnetic induction signals to and from the electronic ink cartridge 20A of the position indicator 1A (step S24).

The processing control section 333A then monitors the return of the electromagnetic induction signal from the electronic ink cartridge 20A of the position indicator 1A, and determines whether the position indicator 1A cannot be detected because the electromagnetic induction signal is not returned (step S25). When the processing control section 333A determines in step S25 that the position indicator 1A can be detected, the processing control section 333A returns the process to step S24. When the processing control section 333A determines in step S25 that the position indicator 1A cannot be detected, the processing control section 333A returns the process to step S21 to set the signal level of the transmission signal to be supplied to the loop coil groups 311X and 312Y to the high level by supplying the current driver 322A with the gain control signal for setting the signal level of the transmission signal to the high level. The processing control section 333A then repeats the process from step S21 on down.

According to the third embodiment described above with reference to FIGS. 13 to 15, the ID signal for identifying the position indicator 1A or the electronic ink cartridge 20A can be transmitted from the position indicator 1A to the position detecting device 300A. Therefore, when an electronic device such as a portable device or the like including the position detecting device 300A detects the ID signal assigned to the position indicator 1A or the electronic ink cartridge 20A, the electronic device can perform a predetermined process corresponding to the position indicator 1A or the electronic ink cartridge 20A, which is very convenient. In addition, the detection of the ID signal of the position indicator 1A or the electronic ink cartridge 20A provides an advantage of facilitating management for failures and the like in the position indicator 1A or the electronic ink cartridge 20A.

In addition, when the position detecting device 300A has started operation, the position detecting device 300A prompts the position indicator 1A to transmit the ID signal possessed by the position indicator 1A. Once the ID signal is received, operation control is performed so as to electrically separate the ID transmitting circuit 400 from the electronic ink cartridge 20A forming the position indicator, and detect a position indicated by the position indicator 1A and pen pressure in a normal use state. Also in a case where it is determined that the ID signal cannot be received as a result of having prompted the position indicator 1A to transmit the ID signal possessed by the position indicator 1A a predetermined number of times, operation control is performed so as to detect a position indicated by the position indicator 1A and pen pressure in the normal use state. Thus, even when a position indicator without the ID signal transmitting function is used, no special process operation is necessary, and operation can be performed without causing any feeling of strangeness.

Incidentally, in the above-described example, when the electronic ink cartridge 20A receives the electromagnetic induction signal at the high level from the position detecting device 300A, the switch control circuit 406 of the position indicator 1A generates the switch control signal for turning on the switch circuit 405 on the basis of the received electromagnetic induction signal at the high level. The power Vcc is thereby supplied to the IC 401.

However, the method of causing the switch control circuit 406 of the position indicator 1A turn on the switch circuit 405 to supply the power Vcc to the IC 401 is not limited to such a method.

For example, as another example, a predetermined digital signal can be sent from the position detecting device 300A to the position indicator 1A to make the switch control circuit 406 receiving the digital signal generate the switch control signal for turning on the switch circuit 405.

Specifically, for example, when the position detecting device 300A has not detected the presence of the position indicator 1A because a position indicated by the position indicator 1A cannot be detected, for example, the position detecting device 300A sends out the predetermined digital signal as an electromagnetic induction signal through the loop coil groups 311X and 312Y. The electronic ink cartridge 20A of the position indicator 1A receives the electromagnetic induction signal having a signal envelope corresponding to the digital signal, and supplies the signal to the switch control circuit 406.

The switch control circuit 406 subjects the signal to waveform shaping and envelope detection, for example, and thereby extracts the digital signal. When the digital signal matches a digital signal set in advance, the switch control circuit 406 generates the switch control signal for turning on the switch circuit 405. The power Vcc is thereby supplied to the IC 401.

The IC 401 starts operation when the power Vcc is turned on, and sends the ID signal of the position indicator 1A to the position detecting device 300A through the electronic ink cartridge 20A. Receiving the ID signal, the position detecting device 300A stops sending out the predetermined digital signal, makes a transition from an ID signal detection mode to a normal use mode for detecting a position indicated by the position indicator 1A, and performs operation for detecting a position indicated by the position indicator 1A. When the predetermined digital signal cannot be received, the switch control circuit 406 of the position indicator 1A turns off the switch circuit 405 to stop the supply of the power Vcc to the IC 401. Thereby, the sending out of the ID signal is stopped, and the ID transmitting circuit 400 is set to a high impedance and electrically separated from the connector 179.

Incidentally, when the position detecting device 300A becomes unable to detect the position indicator 1A, the position detecting device 300A starts sending out the predetermined digital signal again.

Incidentally, in the above description of the third embodiment, the capacitor circuit 16 in the foregoing embodiment is coupled to a coupling member 26. However, in the case of a position indicator without the push switch 7, the capacitor circuit 16 formed by the first capacitor circuit 161 can be coupled to the coupling member 26. In that case, it suffices to provide the cap 17 with only the connector 179 for connecting the ID transmitting circuit 400.

Also in the case of the configuration of a position indicator having the push switch 7, the capacitor circuit 16 coupled to the coupling member 26 may be formed by the first capacitor circuit 161, and two connectors 179 may be provided to the cap 17 so that the ID transmitting circuit 400 is connected to one of the connectors 179, and a series circuit of a capacitor circuit corresponding to the second capacitor circuit and the push switch 7 is connected to the other connector 179.

Fourth Embodiment

A present fourth embodiment is a modification of the third embodiment. Specifically, in the foregoing third embodiment, the connector 179 for connection to the ID transmitting circuit 400 is provided to the cap 17. In the fourth embodiment, the ID transmitting circuit 400 is disposed within the cylindrical body of an electronic ink cartridge. The fourth embodiment to be described in the following is an example in which the ID transmitting circuit 400 is incorporated into an electronic ink cartridge having a similar constitution to that in the foregoing second embodiment.

Figures 16A, 16B, 16C:
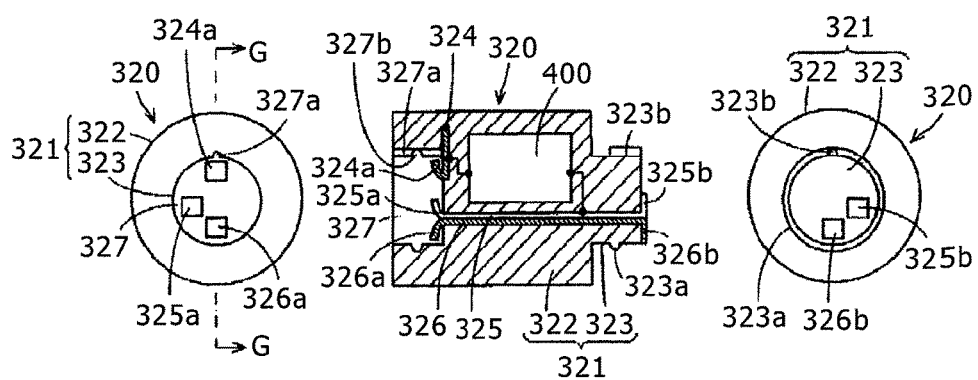
FIGS. 16A, 16B, and 16C are diagrams of assistance in explaining an example of constitution of a fourth embodiment of the electronic ink cartridge according to the present invention.

As shown in FIGS. 16A to 16C, in the fourth embodiment, an ID package 320 in a cylindrical shape incorporating the ID transmitting circuit 400 is prepared. Though not shown, a cylindrical body 50B in the fourth embodiment is longer than the cylindrical body 50 in the second embodiment by the length in the direction of the central axis of the ID package 320.

In the present example, the ID package 320 is disposed between the capacitor circuit 16 and the cap 17 within the hollow part of the cylindrical body. FIG. 16A is a diagram of the ID package 320 as viewed from the side of the capacitor circuit 16. FIG. 16B is a cross-sectional view taken along a line G-G of FIG. 16A. FIG. 16C is a diagram of the ID package 320 as viewed from the side of the cap 17.

As shown in FIG. 16B, the ID package 320 houses the ID transmitting circuit 400 within a package member 321 formed of a cylindrical resin having a large-diameter part 322 and a small-diameter part 323, and has terminal members 324 and 325 connected respectively to the terminals 400a and 400b of the ID transmitting circuit 400 and a terminal member 326 penetrating through the package member 321 without being electrically connected to the ID transmitting circuit 400.

An end surface of the large-diameter part 322 of the package member 321 is opposed to the side of the capacitor circuit 16. A depression part 327 for housing the end part of the second capacitor circuit 162 of the capacitor circuit 16 is formed in the end surface of the large-diameter part 322. Formed in a side wall of the depression part 327 are a depression groove 327a along the direction of the central axis to be engaged with the projection part 162a along the direction of the central axis formed on the second capacitor circuit 162, and a ring-shaped depression groove 327b for receiving the ring-shaped projection part 162b formed on the circumferential surface of the second capacitor circuit 162.

The diameter and length of the small-diameter part 323 of the package member 321 are selected such that the small-diameter part 323 is fitted into the depression part 178 of the cap 17 shown in FIGS. 7A and 7C. Formed on a circumferential surface of the small-diameter part 323 are a ring-shaped projection part 323a to be fitted into the ring-shaped depression groove 178a formed in the depression part 178 of the cap 17, and a projection part 323b along the direction of the central axis to be engaged with the depression groove 178b along the direction of the central axis formed in the depression part 178 of the cap 17.

One end 324a of the terminal member 324 electrically connected to the one terminal of the ID transmitting circuit 400 is exposed at the bottom surface of the depression part 327 of the large-diameter part 322 so as to abut against the other end 1624b of the terminal member 1624 of the second capacitor circuit 162. It suffices for the terminal member 324 to be connected to the one terminal of the ID transmitting circuit 400 within the ID package 320. Thus, another end of the terminal member 324 is not led out to an end surface of the ID package 320 on the side of the cap 17.

One end 325a of the terminal member 325 electrically connected to the other terminal of the ID transmitting circuit 400 is exposed at the bottom surface of the depression part 327 of the large-diameter part 322 so as to abut against the other end 1625b of the terminal member 1625 of the second capacitor circuit 162. Another end 325b of the terminal member 325 is exposed at the end surface of the small-diameter part 323 so as to abut against the one end 172a of the terminal member 172 of the cap 17.

One end 326a of the terminal member 326 not electrically connected to the ID transmitting circuit 400 is exposed at the bottom surface of the depression part 327 of the large-diameter part 322 so as to abut against the other end 1626b of the terminal member 1626 of the second capacitor circuit 162. Another end 326b of the terminal member 326 is exposed at the end surface of the small-diameter part 323 so as to abut against the one end 173a of the terminal member 173 of the cap 17.

In the fourth embodiment, the capacitor circuit 162 is housed within the cylindrical body 50B as in the foregoing second embodiment, and the end part of the second capacitor circuit 162 is inserted into the depression part 327 of the ID package 320, so that the ID package 320 is housed within the cylindrical body 50B.

At this time, the projection part 162a of the second capacitor circuit 162 is engaged with the depression groove 327a of the depression part 327 of the ID package 320, whereby positioning in the circumferential direction is achieved. In addition, the ring-shaped projection part 162b of the second capacitor circuit 162 is fitted into the ring-shaped depression groove 327b of the depression part 327 of the ID package 320, whereby the ID package 320 is coupled to the capacitor circuit 16.

In this coupled state, the other end 1624b of the terminal member 1624, the other end 1625b of the terminal member 1625, and the other end 1626b of the terminal member 1626 on the end surface of the second capacitor circuit 162 abut against, and are electrically connected to, the one end 324a of the terminal member 324, the one end 325a of the terminal member 325, and the one end 326a of the terminal member 326, respectively, on the bottom surface of the depression part 327 of the ID package 320.

Thereafter, the small-diameter part 175 of the cap 17 is inserted into the cylindrical body 50B while the projection part 17c in the direction of the central axis of the cap 17 is engaged with the positioning cut-out 50f of the cylindrical body 50B, and the ring-shaped projection part 50e of the cylindrical body 50B is fitted into the ring-shaped groove part 17a of the small-diameter part 175, whereby the cap 17 is fixed to the cylindrical body 50B. Then, the other end 325b of the terminal member 325 and the other end 326b of the terminal member 326 on the end surface of the ID package 320 on the side of the cap 17 are connected to the one end 172a of the terminal member 172 and the one end 173a of the terminal member 173 of the cap 17. The other constitution is similar to that of the foregoing second embodiment.

In the electronic ink cartridge according to the fourth embodiment, the ID package 320 is housed within the cylindrical body 50B as described above. The ID transmitting circuit 400 is thereby connected in parallel across the coil 23. That is, in FIG. 13 described above, the ID transmitting circuit 400 is connected in parallel with the coil 23 and the first capacitor circuit 161 without the interposition of the connector 179.

Therefore, also in the fourth embodiment, the position detecting device 300A described in the foregoing third embodiment can recognize the identifying information of the electronic ink cartridge on the basis of an electromagnetic induction signal from the electronic ink cartridge.

Incidentally, because it suffices for the ID transmitting circuit 400 to be connected in parallel with the coil 23, the ID package 320 is not limited only to being provided between the capacitor circuit 16 and the cap 17. For example, the ID transmitting circuit 400 may be provided between the coupling member 26 and the capacitor circuit 16.

Other Embodiments

In the foregoing embodiments, a pressure sensing semiconductor device is used as a pressure sensitive element that changes in capacitance according to pressure (pen pressure) applied to a core body. However, the pressure sensitive element is not limited to this. For example, a variable capacitor that changes in capacitance according to pressure (pen pressure) applied to a core body, for which an application has been filed as Japanese Patent Application No. 2012-151357 by the present applicant, can also be used.

In the variable capacitor described in Japanese Patent Application No. 2012-151357, an electrode of a predetermined shape is laminated and formed on an inner wall surface of a hollow part of an outside member formed of a cylinder having the hollow space. An electrode of a predetermined shape is also formed on an outer circumferential surface of a columnar inside member. Then, the inside member is housed within the hollow space of the outside member so as to be movable in the direction of a central axis. In this case, the electrode on the inner wall surface of the outside member and the electrode on the outer circumferential surface of the inside member are opposed to each other with a dielectric interposed between the electrodes, whereby a capacitor exhibiting a capacitance corresponding to the opposed area of the electrodes is formed.

According to this constitution, when a pressure is externally applied to the inside member in the direction of the central axis, the inside member moves in the direction of the central axis with respect to the outside member, thereby changing the area formed between the electrode on the inner wall surface of the outside member and the electrode on the outer circumferential surface of the inside member that oppose each other with the dielectric interposed between the electrodes. Therefore, the capacitor formed between the electrode of the outside member and the electrode of the inside member exhibits a capacitance corresponding to the applied pressure due to the change in the opposed area of the two electrodes.

The variable capacitor formed as described above can be formed in the shape of a thin rod, and an electronic ink cartridge using the variable capacitor as a pressure sensitive element in place of the pressure sensing semiconductor device 15 can be formed.

In addition, the capacitor circuit 16 is used, which has a constitution in which chip capacitors are stacked and whose capacitance is adjusted by the number of stacked capacitors. However, the capacitor circuit 16 is not limited to this. For example, a capacitor for which an application has been filed as Japanese Patent Application No. 2012-128834 by the present applicant can be used, the capacitor having a constitution obtained by rolling, into a rod shape, a dielectric sheet on which an electrode of a predetermined pattern shape is formed. The capacitor described in Japanese Patent Application No. 2012-128834 allows part of the electrode pattern in the rod-shaped capacitor to be cut (severed) or connected afterward, and can thereby be adjusted in capacitance afterward.

In addition, in the foregoing embodiments, the end surface of the coupling member disposed between the coil 13 or the coil 23 and the capacitor circuit 16 on the side of the capacitor circuit 16 is provided with two connecting terminals for electrically connecting the one end and the other end of the coil 13 or the coil 23 to the one terminal and the other terminal of the capacitor. However, when the cylindrical body 5 or the cylindrical body 50 is a conductive non-magnetic material such as SUS301 in the above-described example, it is also possible to dispose at least one of the two connecting terminals in the end surface of the coupling member, and use the conductive cylindrical body 5 or 50 as the other connecting terminal.

For example, in the foregoing first embodiment, only the one end 158a of the terminal member 158 is provided at the bottom surface of the depression part 156 of the package member 151 performing the functions of a coupling member for mechanical and electrical coupling to the capacitor circuit 16, such that the insertion hole 158b of the one end 158a of the terminal member 158 is exposed, and the end part 157a of the terminal member 157 is exposed on the circumferential part of the package member 151 rather than the bottom part of the depression part 156, and is electrically coupled to the first cylindrical body 5A.

In the first capacitor circuit 161 of the capacitor circuit 16, the one end 1615a as a rod-shaped body of the terminal member 1615 is formed as in the foregoing embodiments, while the one end 1614a of the terminal member 1614 is exposed on the circumferential part of the holder 1610, and is electrically coupled to the second cylindrical body 5B.

In the case of such a constitution, the capacitor circuit 16 is inserted into the depression part 156 of the package member 151, and the first cylindrical body 5A and the second cylindrical body 5B are screwed and coupled to each other, whereby electric connection is established. In this case, the cylindrical body 5 is preferably a ground electrode.

Also in the second embodiment, similarly, for example, only the end part 263b of the terminal member 263 is provided at the bottom surface of the depression part 268 of the coupling member 26 such that the insertion hole 263e of the end part 263b of the terminal member 263 is exposed, and the end part 262b of the terminal member 262 is exposed on the circumferential part of the main body part 260 rather than the bottom part of the depression part 268, and is electrically coupled to the cylindrical body 50.

In the second embodiment, based on insertion of the capacitor circuit 16 into the cylindrical body 50, the one end 1614a of the terminal member 1614 exposed on the circumferential part of the holder 1610 is electrically connected to the cylindrical body 50.

In addition, in the fourth embodiment, the ID package 320 can be formed such that the end part 324a of the terminal member 324 is exposed on the circumferential part of the large-diameter part 322 instead of being exposed at the bottom surface of the depression part 327, and the end part 324a of the terminal member 324 can be electrically connected by inserting the ID package 320 into the cylindrical body 50.

Other Embodiments and Modifications

As described above, in the electronic ink cartridge according to the present invention, the ferrite core wound with the coil and the pressure sensitive element are arranged between the end part on the side, where the core body is located, and the coupling member in the cylindrical body. As described in the foregoing first and second embodiments, either of the ferrite core wound with the coil and the pressure sensitive element may be on the side of the coupling member in the order of arrangement in the direction of the central axis of the cylindrical body. In addition, the three members of the coupling member, the ferrite core wound with the coil, and the pressure sensitive element may be coupled to each other as independent members, the three members may be combined and integrated with each other, or two of the three members may be combined and integrated with each other.

Specifically, constitutions of the following eight combinations can be formed in the electronic ink cartridge.

(1) The ferrite core wound with the coil, the pressure sensitive element, and the coupling member are coupled to each other in this order as independent members.

(2) The pressure sensitive element, the ferrite core wound with the coil, and the coupling member are coupled to each other in this order as independent members.

(3) A structure formed by coupling the ferrite core wound with the coil, the pressure sensitive element, and the coupling member to each other in this order is unitized as an integrated structure.

(4) A structure formed by coupling the pressure sensitive element, the ferrite core wound with the coil, and the coupling member to each other in this order is unitized as an integrated structure.

(5) A separate coupling member is coupled to a structure unitized by coupling the ferrite core wound with the coil and the pressure sensitive element to each other in this order into an integrated structure.

(6) A separate coupling member is coupled to a structure unitized by coupling the pressure sensitive element and the ferrite core wound with the coil to each other in this order into an integrated structure.

(7) A structure unitized by providing the coupling member integrally with the pressure sensitive element is coupled to the ferrite core wound with the coil disposed on the side of the core body.

(8) A structure unitized by providing the coupling member integrally with the ferrite core wound with the coil is coupled to the pressure sensitive element disposed on the side of the core body.

In addition, as described above, the electronic ink cartridge according to the present invention can be handled in a similar manner to an ink cartridge (refill) housed in a casing, such as a ballpoint pen as a writing instrument. Ballpoint pens are known which have structures in which an ink cartridge is switched by a so-called push action system or a twist action system between a state of a pen point being housed within a casing and a state of the pen point being extended out to the outside of the casing, and in which a plurality of ink cartridges including inks of different colors, for example, are selected and a pen point is extended out from a casing.

Accordingly, the position indicator according to the present invention can similarly have a structure in which the electronic ink cartridge is switched by the so-called push action system or the twist action system between a state of the core body being housed within the casing and a state of the core body being extended out to the outside of the casing. In addition, the position indicator according to the present invention can have for example a constitution allowing selection of a plurality of electronic ink cartridges whose core bodies are different from each other in thickness or allowing selection of an ink cartridge for a ballpoint pen and an electronic ink cartridge.

It is to be noted that while a pressure sensing semiconductor device or a cylindrical capacitor is used as a capacitor as a pressure sensitive element changing in capacitance according to pen pressure in the foregoing embodiments, it is needless to say that the pressure sensitive element changing in capacitance according to pen pressure is not limited to this example.

DESCRIPTION OF REFERENCE NUMERALS

1 . . . Position indicator, 2 . . . Casing, 5, 50 . . . Cylindrical body, 7 . . . Push switch, 10, 20 . . . Electronic ink cartridge, 11, 21 . . . Core body, 13, 23 . . . Coil, 14, 24 . . . Ferrite core, 15, 25 . . . Pressure sensing semiconductor device, 16 . . . Capacitor circuit, 17 . . . Cap, 26 . . . Coupling member

The invention claimed is:

1. A pressure sensing module, configured to be included in a pen-shaped position pointer having a pen tip to which a pressure is exerted, the pressure sensing module comprising:

a pressure sensing component having a central axis, first and second axial ends and first and second terminals, for sensing a pressure exerted to the pen tip of the pen-shaped position pointer, wherein the pressure sensing component causes a capacitance change according to the pressure that is exerted to the pen tip and to the first axial end, the capacitance change appearing between the first terminal and the second terminal, a coil wound around a magnetic core having a central axis and first and second axial ends, the coil including a first end and a second end, wherein the first end of the coil opposes the second axial end of the pressure sensing component, and the first and second ends of the coil are electrically connected to the first and second terminals of the pressure sensing component, respectively, a connection member having a central axis and first and second axial ends, the connection member being disposed such that its first axial end opposes the second end of the coil and the central axis of the connection member is aligned with the central axis of the pressure sensing component, the connection member including a peripheral side surface that defines at least one recessed portion, and at least one terminal member made of conductive material and having a first end part and a second end part, the first end part extending in the at least one recessed portion in a direction perpendicular to the peripheral side surface, the first end part of the at least one terminal member being electrically connected to the first end of the coil, and the second end part of the at least one terminal member being led out from the second axial end of the connection member.

2. The pressure sensing module of claim 1, wherein the first end part of the at least one terminal member extending in the direction perpendicular to the peripheral side surface does not protrude beyond the peripheral side surface.

3. The pressure sensing module of claim 1, wherein the first end part of the at least one terminal member includes a notch that receives the first end of the coil.

4. The pressure sensing module of claim 1, comprising two of the terminal members, wherein the peripheral side surface of the connection member defines two recessed portions, and the first end parts of the two terminal members respectively extend in the two recessed portions in directions perpendicular to the peripheral side surface, respectively, the first end parts of the two terminal members being electrically connected to the first and second ends of the coil, respectively.

5. The pressure sensing module of claim 1, wherein the at least one recessed portion has an elongated shape extending along the central axis of the connection member.

6. The pressure sensing module of claim 1, wherein the connection member is made of non-magnetic material, and the at least one terminal member is inserted in the non-magnetic connection member.

7. The pressure sensing module of claim 1, wherein the at least one recessed portion is a groove.

8. The pressure sensing module of claim 1, wherein the coil is disposed between the pressure sensing component and the connection member.

9. The pressure sensing module of claim 1, comprising two of the terminal members, wherein the first end parts of the two terminal members respectively extend in the direction perpendicular to the peripheral side surface, and the first and second ends of the coil are electrically connected to the two terminal members, respectively.

10. The pressure sensing module of claim 9, wherein the first and second ends of the coil are electrically connected to the first end parts of the two terminal members, respectively.

11. The pressure sensing module of claim 10, wherein the first and second ends of the coil are electrically connected to notches provided to the first end parts of the two terminal members, respectively.

12. The pressure sensing module of claim 1, wherein the magnetic core is made of ferrite material.

13. The pressure sensing module of claim 1, wherein the magnetic core and the connection member respectively have a cylindrical shape, and an outer diameter of the coil wound around the magnetic core substantially equals an outer diameter of the connection member.

* * * * *